US007513425B2

(12) United States Patent
Chung

(10) Patent No.: US 7,513,425 B2
(45) Date of Patent: *Apr. 7, 2009

(54) ARTICLE TRACKING SYSTEM AND METHOD

(75) Inventor: Kevin Kwong-Tai Chung, Princeton, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/414,916

(22) Filed: May 1, 2006

(65) Prior Publication Data
US 2006/0192003 A1    Aug. 31, 2006

Related U.S. Application Data

(63) Continuation of application No. 11/074,570, filed on Mar. 8, 2005, now Pat. No. 7,036,729, which is a continuation of application No. 10/408,151, filed on Apr. 7, 2003, now Pat. No. 6,883,710, which is a continuation of application No. PCT/US01/31828, filed on Oct. 11, 2001, and a continuation of application No. PCT/US01/42563, filed on Oct. 9, 2001.

(60) Provisional application No. 60/239,293, filed on Oct. 11, 2000, provisional application No. 60/239,649, filed on Oct. 12, 2000, provisional application No. 60/240,748, filed on Oct. 16, 2000, provisional application No. 60/243,640, filed on Oct. 26, 2000, provisional application No. 60/245,596, filed on Nov. 3, 2000, provisional application No. 60/248,454, filed on Nov. 14, 2000, provisional application No. 60/255,162, filed on Dec. 13, 2000, provisional application No. 60/260,849, filed on Jan. 10, 2001, provisional application No. 60/303,994, filed on Jul. 6, 2001, provisional application No. 60/304,017, filed on Jul. 9, 2001, provisional application No. 60/305,686, filed on Jul. 16, 2001, provisional application No. 60/323,514, filed on Sep. 19, 2001.

(51) Int. Cl.
*G06F 19/00* (2006.01)
(52) U.S. Cl. ...................................... 235/385; 235/382
(58) Field of Classification Search ................ 235/380, 235/382, 379, 375, 492, 486, 487
See application file for complete search history.

(56) References Cited

U.S. PATENT DOCUMENTS 4,791,655 A * 12/1988 Nagata et al. .................. 378/57

(Continued)

FOREIGN PATENT DOCUMENTS

WO    WO 99/45498 A1    9/1999

(Continued)

OTHER PUBLICATIONS

International Search Report & Written Opinion, PCT/US05/30272, Apr. 20, 2006, 8 pages.

(Continued)

*Primary Examiner*—Thien M Le
(74) *Attorney, Agent, or Firm*—Dann, Dorfman, Herrell & Skillman, PC; Clement A. Berard, Esq.

(57) ABSTRACT

A system and method are useful for tracking and/or managing an article at one or more stations. An RFID tag including a memory and an antenna is associated with reach article, and an RFID tag reader at the station has plural antennas for communicating with RFID tags and reading information therefrom. The read information is communicated to a processor and stored in a database. The information stored in the database may be utilized for tracking and/or managing the article, whereby the article being tracked and/or managed may be located and its history obtained, for use in various environments.

33 Claims, 9 Drawing Sheets

U.S. PATENT DOCUMENTS

| | | | |
|---|---|---|---|
| 4,968,873 | A | 11/1990 | Dethloff et al. |
| 5,221,831 | A | 6/1993 | Geiszler |
| 5,257,011 | A | 10/1993 | Beigel |
| 5,272,318 | A | 12/1993 | Gorman |
| 5,291,411 | A | 3/1994 | Bianco |
| 5,396,218 | A | 3/1995 | Olah |
| 5,465,082 | A | 11/1995 | Chaco |
| 5,566,327 | A | 10/1996 | Sehr |
| 5,627,517 | A | 5/1997 | Theimer et al. |
| 5,661,470 | A * | 8/1997 | Karr ................... 340/10.33 |
| 5,675,628 | A | 10/1997 | Hokkanen |
| 5,875,434 | A * | 2/1999 | Matsuoka et al. ............. 705/28 |
| 5,887,176 | A * | 3/1999 | Griffith et al. ............... 713/320 |
| 5,892,706 | A | 4/1999 | Shimizu et al. |
| 5,914,671 | A * | 6/1999 | Tuttle ...................... 340/10.42 |
| 5,936,527 | A * | 8/1999 | Isaacman et al. ......... 340/572.1 |
| 5,962,834 | A | 10/1999 | Markman |
| 5,963,134 | A | 10/1999 | Bowers et al. |
| 6,056,199 | A | 5/2000 | Wiklof et al. |
| 6,077,106 | A | 6/2000 | Mish |
| 6,078,928 | A | 6/2000 | Schnase et al. |
| 6,097,301 | A | 8/2000 | Tuttle |
| 6,112,240 | A | 8/2000 | Pogue et al. |
| 6,246,882 | B1 | 6/2001 | Lachance |
| 6,285,342 | B1 * | 9/2001 | Brady et al. ................. 343/895 |
| 6,287,765 | B1 | 9/2001 | Cubicciotti |
| 6,288,629 | B1 | 9/2001 | Cofino et al. |
| 6,294,997 | B1 * | 9/2001 | Paratore et al. .......... 340/572.1 |
| 6,317,049 | B1 | 11/2001 | Toubia et al. |
| 6,366,777 | B1 | 4/2002 | Uusitalo |
| 6,418,372 | B1 | 7/2002 | Hofmann |
| 6,421,013 | B1 * | 7/2002 | Chung ................. 343/700 MS |
| 6,427,073 | B1 | 7/2002 | Kortesalmi et al. |
| 6,427,913 | B1 * | 8/2002 | Maloney ..................... 235/383 |
| 6,512,478 | B1 * | 1/2003 | Chien .................... 342/357.09 |
| 6,539,281 | B2 | 3/2003 | Wan et al. |
| 6,594,370 | B1 | 7/2003 | Anderson |
| 6,600,418 | B2 | 7/2003 | Francis et al. |
| 6,600,420 | B2 | 7/2003 | Goff et al. |
| 6,669,089 | B2 | 12/2003 | Cybulski et al. |
| 6,690,402 | B1 * | 2/2004 | Waller et al. ................. 715/850 |
| 6,720,865 | B1 * | 4/2004 | Forster et al. .............. 340/10.1 |
| 6,834,251 | B1 | 12/2004 | Fletcher |
| 6,853,294 | B1 | 2/2005 | Ramamurthy et al. |
| 7,098,793 | B2 | 8/2006 | Chung |
| 7,382,255 | B2 | 6/2008 | Chung |
| 2002/0016739 | A1 * | 2/2002 | Ogasawara ................... 705/22 |
| 2002/0073646 | A1 * | 6/2002 | Von Gutfeld et al. ........... 53/54 |
| 2002/0118097 | A1 | 8/2002 | Heinrich et al. |
| 2003/0216969 | A1 | 11/2003 | Bauer et al. |
| 2003/0220711 | A1 | 11/2003 | Allen |
| 2003/0222141 | A1 | 12/2003 | Vogler et al. |
| 2004/0000997 | A1 | 1/2004 | Stevens, III |
| 2004/0217867 | A1 | 11/2004 | Bridgelall et al. |

FOREIGN PATENT DOCUMENTS

| | | |
|---|---|---|
| WO | WO 00/77536 A2 | 12/2000 |
| WO | WO 02/31629 A2 | 4/2002 |

OTHER PUBLICATIONS

Frontline Solutions, "RFID Standards Buoy Packaging", Jul. 2001, 3-Pages.

Frontline Solutions, "Packagers Think Outside The Box", May 2001, 3 Pages.

Frontline Solutions, "RFID Baggage Tracking Solution Helps Keep SFIA Secure", Jul. 2001, 4 Pages.

Frontline Solutions, "Standard Response", Jul. 2001, 1 Page.

Avante International Technology, Inc., "How Does Leads-Trakker Work To Enhance The Values For Exhibitors And Visitors?", 2002, 3 Pages.

Leads-Trakker Web Pages, http:/www.leads-trakker.com/ Printed Nov. 18, 2002, 17 pages.

International Search Report, PCT/US01/42563, Sep. 18, 2002.

* cited by examiner

ARTICLE TRACKING SYSTEM AND METHOD

This application is a continuation of U.S. patent application Ser. No. 11/074,570 filed on Mar. 8, 2005 now U.S. Pat. No. 7,036,729, which is a continuation of U.S. patent application Ser. No. 10/408,151 filed on Apr. 7, 2003 now U.S. Pat. No. 6,883,710, which is a continuation of PCT International Application No. PCT/US01/31828 filed Oct. 11, 2001 and of PCT International Application No. PCT/US01/42563 filed Oct. 9, 2001, one or both of which PCT International Applications claim the benefit of:

U.S. Provisional Application Ser. No. 60/239,293 filed Oct. 11, 2000,
U.S. Provisional Application Ser. No. 60/239,649 filed Oct. 12, 2000,
U.S. Provisional Application Ser. No. 60/240,748 filed Oct. 16, 2000,
U.S. Provisional Application Ser. No. 60/243,640 filed Oct. 26, 2000,
U.S. Provisional Application Ser. No. 60/245,596 filed Nov. 3, 2000,
U.S. Provisional Application Ser. No. 60/248,454 filed Nov. 14, 2000,
U.S. Provisional Application Ser. No. 60/255,162 filed Dec. 13, 2000,
U.S. Provisional Application Ser. No. 60/260,849 filed Jan. 10, 2001,
U.S. Provisional Application Ser. No. 60/303,994 filed Jul. 6, 2001,
U.S. Provisional Application Ser. No. 60/304,017 filed Jul. 9, 2001,
U.S. Provisional Application Ser. No. 60/305,686 filed Jul. 16, 2001,
U.S. Provisional Application Ser. No. 60/323,514 filed Sep. 19, 2001, and
U.S. patent application Ser. No. 09/854,722 filed May 14, 2001.

The present invention relates to an article tracking system and method, in particular, to such system and method useful in various environments.

In a manufacturing operation, in a warehousing operation, in a shipping and/or receiving operation, in a transportation operation, in a wholesale or a retail merchandising operation, and in many other operations there is a desire to maintain a complete, accurate and up to date inventory or other record of the units of products made, stored, received, processed, shipped and/or sold. Automated or automatic methods of providing such record are desirable, however, conventional methods all have shortcomings that result in less than the desired record being provided.

Labels and/or plastic cards and tags associated with units of product were an attempt to afford relative automated record keeping, but tended to be cumbersome to use and error prone. More sophisticated automatic methods employed bar-coded labels and/or magnetic stripe cards and tags, each with suitable readers. While the cost of such labels and cards is low, so is the information that can be embedded or coded in either of these media. In addition, most readers are read-only devices and cannot store any additional information in the bar-code label or magnetic stripe card.

Moreover, bar-code media require a "line-of-sight" communication path between device and reader, and magnetic stripe media require a direct or close contact communication path between device and reader at a suitable "swiping speed," and the reliability of correct reading is about 80-90%, as anyone who has gone through a store check-out bar-code reader or a magnetic stripe credit card reader will recognize. Repeated passes of the product in front of the bar-code reader or swipes of the credit card through the card reader create delay and annoyance in these settings, and produce record errors in other applications.

Electronic tracking using radio frequency identification (RFID) tags is one way to overcome the disadvantages of the prior art bar-code and magnetic stripe approaches. Prior art systems typically do not track the articles to be tracked along the processing path and/or do not have reliable, essentially 100% correct reader performance, essentially without the need for human intervention, as is desirable for providing complete and accurate records.

In a manufacturing operation, for example, there is a need to monitor progress and productivity as well as to keep track of the product being produced. To this end, it would be desirable to have a system that provides a record including identification of the operator and work time or processing time at each work station, operator "signature," and other information of interest, preferably for each item of product. A reader to capture such information, as well as a way for storing such information, and for associating such information with a particular unit of product, is also desirable.

In a shipping or receiving operation, for example, paper documents conventionally contain the necessary information, such as product type, serial number, manufacturer, customer, owner, and the like, relating to each item of product. Even bar-coded labels and magnetic stripe cards have not proved completely satisfactory due to the need for line-of-sight readers and significantly less than 100% reading rate and/or accuracy.

Accordingly, there is a need for a method and system that can track and/or manage an article at one or more stations, and that does not require line-of-sight readers.

To this end, a method for tracking articles, managing articles, or both, may comprise:
  associating at least one RFID tag with an article, the RFID tag including an electronic memory containing information relating to the article and an antenna coupled to the electronic memory for transmitting and/or receiving information-bearing signals in an RFID tag format;
  providing a first station comprising a first RFID reader for transmitting and/or receiving information-bearing signals in the RFID tag format via a plurality of antennas defining detection regions proximate the first station;
  communicating information contained in the received information-bearing signals from RFID tags in the detection regions of the first RFID reader to a processor;
  storing in a database associated with the processor at least information contained in the received information-bearing signals, wherein the information stored in the database includes information relating to the articles; and
  processing information from the data base for utilizing the articles.

According to another aspect, a system for tracking articles, managing articles, or both, may comprise:
  at least one RFID tag associated with an article, the RFID tag including an electronic memory containing information relating to the article and an antenna coupled to the electronic memory for transmitting and/or receiving information-bearing signals in an RFID tag format;
  a first station comprising a first RFID reader for transmitting and/or receiving information-bearing signals in the RFID tag format via a plurality of antennas defining detection regions proximate the first station;
  a processor including a database;

means for communicating information contained in the received information-bearing signals from RFID tags in the detection regions of the first RFID reader to the database of the processor, the processor storing in the database thereof at least information contained in the received information-bearing signals, wherein the information stored in the database of the processor includes information relating to the articles; and the processor processing information from the data base thereof for utilizing the articles.

BRIEF DESCRIPTION OF THE DRAWING

The detailed description of the preferred embodiments of the present invention will be more easily and better understood when read in conjunction with the FIGURES of the Drawing which include.

Figure 1:
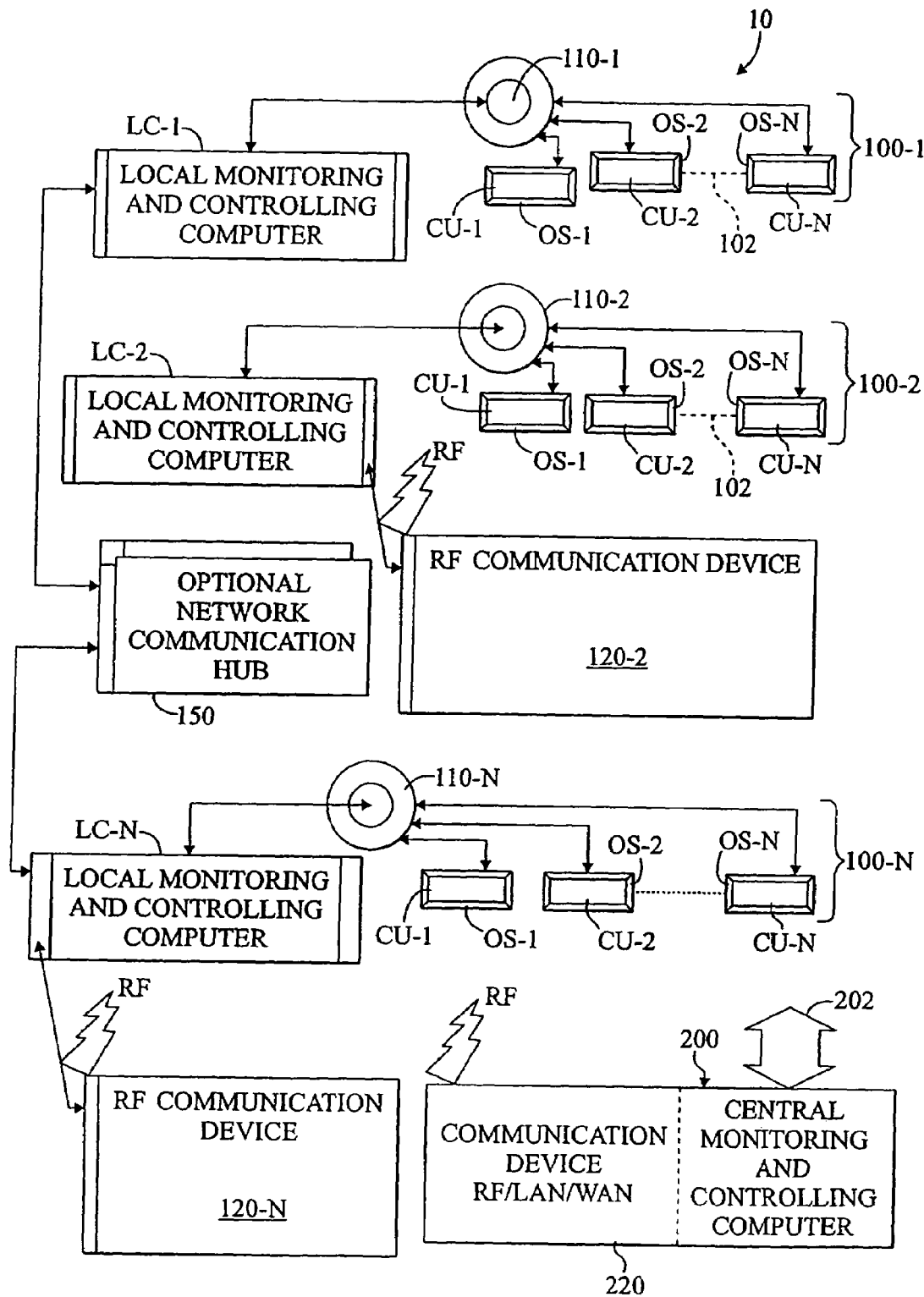
FIG. 1 is a schematic block diagram illustrating an example embodiment of a tracking system in accordance with the present arrangement.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similar elements may be shown in the same figure designated by different "dash numbers" such as X-1, X-2, and so on. It is noted that, according to common practice, the various features of the drawing are not to scale, and the dimensions of the various features are arbitrarily expanded or reduced for clarity.

DESCRIPTION OF THE PREFERRED EMBODIMENT

A system according to the present arrangement is useful for tracking an article at a plurality of stations. A smart tag is associated with each article to be tracked, for example, by being attached to the article either directly or indirectly, e.g., to a container containing the article. The smart tag includes at least an electronic memory coupled to an antenna by which information from the memory may be transmitted and/or information may be received and stored in the memory. Smart tag control units (readers and/or writers) and antenna arrays at the stations communicate with the smart tags and communicate directly or indirectly with one or more processors that process the information, for example, such as for monitoring and/or controlling the stations and/or control units and/or lines including one or more stations.

FIG. 1 is a schematic block diagram illustrating an example embodiment of a tracking system 10 in accordance with the present arrangement. System 10 includes one or more "operation lines" 100-1, 100-2, ... 100-N of stations OS-1, OS-2, ... OS-N within or associated with one or more plants or facilities or parts thereof. Operation line refers to any collection or group of one or more stations OS-1, OS-2, ... OS-N at which one or more related or unrelated operations may be performed. Dotted line 102 indicates that additional stations 100 may be included. Examples of operations include, but are not limited to, manufacturing operations, processing, testing, inspecting, operation timing, productivity monitoring, work and/or time recording, inventory operations, quality control operations, shipping operations, receiving operations, storage operations, sales operations, displaying, buying operations, wholesale operations and retail operations.

Each station OS-1, OS-2, ... OS-N includes a control unit CU-1, CU-2, ... CU-N for communicating with smart tags when the smart tag is within the detection region of the control unit and its associated antenna array (not shown in FIG. 1). Each antenna array includes a plurality of antenna, typically loop antenna, arranged so that a smart tag within the detection region will be detected with substantially 100% reliability. The antenna array typically produces and/or is responsive to electromagnetic fields having a component in each of three orthogonal directions, or at least in directions coupling with the antenna of the smart tag in any orientation it may be in when in the detection region.

Stations OS-1, OS-2, ... OS-N of each operation line 100-1, 100-2, ... 100-N are coupled for direct or indirect communication with a computer or processor LC, 200, for the communication of information therebetween or among, and for the processing of the information as further described herein, at least for the monitoring of operations at the stations and/or for controlling the stations. While only one processor (computer) is necessary to the system 10, it is often convenient to employ a network of processors (computers) in which plural de-centralized processors LC are linked, as by a network, for example, to a central processor 200. Typically, each local processor LC is associated with one or more stations OS for monitoring the operation thereof and/or for controlling such station(s) OS, and is linked with the central processor 200 for communicating monitoring information therewith and/or for communicating control and/or programming information therewith. Thus, operation stations OS may operate independently, under the control of local computer LC, under control of central computer 200, or some combination thereof.

Such communication between and among stations OS-1, OS-2, ... OS-N and one or more computers or processors LC, 200 may be by any convenient communication apparatus, such as by wires and cables, radio or RF transmission, local area network (LAN), wide area network (WAN), optical fiber, and the like, or combinations thereof. While such communication may be direct, it is typically at least partially indirect in that one or more communication hubs 110, 150 and or communication devices 120, 220 may couple one or ones of stations 100-1, 100-2, ... 100-N with one or ones of local computers/local processors LC-1, LC-2, ... LC-N and/or central computer/central processor 200.

As illustrated in FIG. 1, for example, stations 100-1, 100-2, ... 100-N of line 100-1 are coupled for communication with local processor LC-1 via communication hub 110-1, stations 100-1, 100-2, ... 100-N of line 100-2 are coupled for communication with local processor LC-2 via communication hub 110-2, and stations 100-1, 100-2, . . . 100-N of line 100-N are coupled for communication with local processor LC-N via communication hub 110-N, but could be coupled directly, by RF communication or otherwise. Typically, information is communicated among control units CU, local processor LC and central processor 200 in real time or essentially real time. Alternatively, for example, information may be communicated to local processor LC when an article is completed at the last station OS-N and from local processor LC to central processor at predetermined times or upon demand.

Lines 100-1 and 100-N are coupled for communication with local processor LC-1 via network communication hub 150, which hub is optional, and to central processor 200 as indicated by the broad arrow 202 associated with central processor 200. Additionally and/or alternatively, as illustrated by lines 100-2 and 100-N, local processors LC-2 and LC-N are coupled by communication devices 120-2, 120-N, respectively, for communication with each other and for communication with central processor 200 via communication device 220 associated therewith. Communication devices 120, 220 may be of any suitable type, such as RF, LAN, WAN, optical and the like. Communication devices 120 as described may also be employed for communication between any station OS and its associated local processor LC and/or central processor 200, or for any line 100 or lines 100 therewith.

Any convenient communication protocol, such as the RS-485 or RS-232, may be employed. The selection of wired and/or wireless communication among various elements of system 10 typically will depend on the location, proximity and geography of the various elements and the relative ease of providing wire, cable or optical fiber as compared to wireless radio frequency or optical communication.

Communication may occur periodically, but promptly (e.g., within seconds) relative to the speed and frequency of the operations and information being transmitted, such as operation performed and the time and date thereof, and the timeliness of tracking and monitoring desired. Communication may be periodic, but less frequent, regarding the status of a station OS, such as for bill-of-material vs. actual-material information and proper functioning of the article being processed. Periodic communication may be beneficial for wireless communication to reduce frequency spectrum and bandwidth requirements, and communication units may be placed at higher locations and unobstructed positions, such as in a tall building, or other suitable location for proper communication.

Some or all of lines 100-1, 100-2, . . . 100-N may communicate with local processor LC which in turn communicates with central computer/processor 200, as illustrated, or, alternatively, some or all of lines 100-1, 100-2, . . . 100-N or of stations OS-1, OS-2, . . . OS-N may communicate directly with central computer/processor 200 without a local processor LC. Further, any of stations OS-1, OS-2, . . . OS-N may operate independently of (i.e. not under the control of) a local processor LC and/or a central processor 200, but communicating information to a local processor LC and/or central processor 200 for the monitoring of operations as such stations.

Suitable communication devices are available commercially from several sources and provide direct communication or communication via relay links. Such devices are suitable for communication between computers over local area and wide area networks and may employ CDMA and/or spread spectrum communication techniques. For example, RF communication devices available from Proxim, Inc., located in Sunnyvale, Calif., include, for example, a RangeLAN2 system operating at 2.4 GHZ, a Stratum Building-to-Building system, and a Symphony Home and Small Office system. Such devices can transmit and receive information and programming changes between and among central processor 200, local computers LC and/or control units CU equipped with a compatible communication device.

Figure 2:
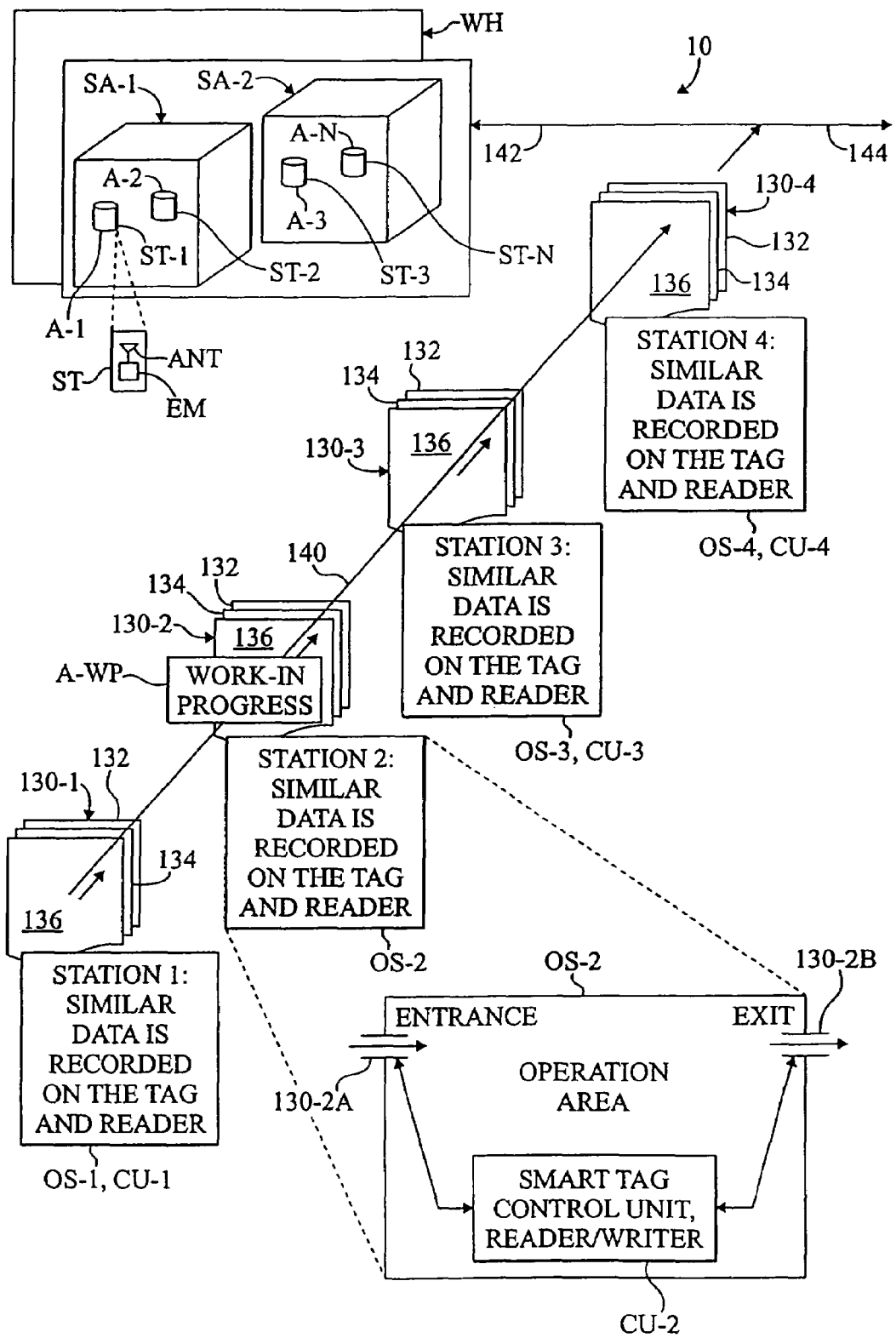
FIG. 2 is a schematic block diagram illustrating an example of one or more stations and/or operations including the present arrangement and useful with a system according to the present arrangement.

FIG. 2 is a schematic block diagram illustrating an example of one or more stations and/or operations OS-1 through OS-4 including the present arrangement and useful with a system 10 according to the present arrangement. Articles A upon which operations are to be performed pass through stations OS-1-OS-4 at which such operations are performed as generally indicated by arrow 140. Articles A pass through the respective detection regions of antenna arrays 130-1 through 130-4 as they pass stations OS-1-OS-4 and so are detected by the respective smart tag control units CU of stations OS-1-OS-4.

Antenna arrays 130 each include plural antenna 132, 134, 136 that may be disposed at ones of stations OS-1-OS-4 and/or between ones of stations OS-1-OS-4 in an "all-orientation" manner so as to detect a smart tag ST in its detection region irrespective of the orientation of the smart tag ST. Antenna arrays 130 may be disposed "in front" of and "behind" a given station OS to include detection regions at an entrance to and at an exit from a station OS, as illustrated by entrance antenna array 130-2A and exit antenna array 130-2B in the detail diagram of OS-2. Plural antenna 132, 134, 136 of a given antenna array 130 are preferably sequentially activated (i.e. activated one at a time in sequence) so that they do not interfere with each other. Entrance antenna array 130-2A and exit antenna array 130-2B are sometimes referred to as an "entrance gate" and an "exit gate" to station OS.

Where stations OS and therefore antenna arrays 130 are in close proximity, e.g., within about 10-50 meters, one smart tag control unit CU may be utilized with a plurality of antenna arrays 130. In such case, the individual antenna 132, 134, 136 of each of the arrays 130 are sequentially activated, preferably so that only one antenna is active at any given time. The switching arrangement or hub for sequentially coupling the individual antenna 132, 134, 136 to the reader/writer of control unit CU may either be included in control unit CU or may be remote from control unit CU, typically proximate to antenna arrays 130.

Each antenna array 130 (including antenna arrays 130 having an entrance antenna array 130-2A and an exit antenna array 130-2B) is coupled to a smart tag control unit CU (CU-2) that includes at least a smart tag reader for reading information produced from the electronic memory EM of a smart tag ST within its detection region and preferably also includes a smart tag writer for transmitting information for storing the information in the memory EM of smart tag ST. Such information may include, for example, the identification of the article, the operation or of the operator or inspector, process and/or quality control information, arrival and departure times of an article A, start and finish times of the operation, date and time, process conditions and any other information of interest for tracking, control, quality, efficiency or other management purposes.

Each station OS is coded with information pertinent to the operation performed thereat, which information is transmitted to the smart tag ST associated with the article A then at the station OS and stored in its memory EM. In addition, a station OS may include a keypad or keyboard for the entry of additional information, e.g., by an operator or inspector, typically in interaction with information read from the smart tag ST of an article A then at that station OS. Typically, such information may include, for example, quality or inspection information, scrap or waste information, and/or other information peculiar to that station at that time, and any other information of interest for tracking, control, quality, efficiency or other management purposes.

The information so obtained may, in addition to being used for tracking articles A and control of stations OS, be used for management such as for calculating efficiency, product yield, operator work time and idle time and break time, productivity, and process metrics. Such information as used in manufacturing and inventory control may be used directly for standard MRPII or standard manufacturing resource/requirement planning. Typically and preferably, the information so obtained is communicated to the processor LC, 200 for monitoring and control and preferably is also transmitted via control unit CU and antenna array 130 to antenna ANT of smart tag ST and stored in electronic memory EM thereof.

In the example where system 10 is utilized in manufacturing to monitor the manufacturing processes, smart tags ST are attached to each unit to be built, typically to a basic or major component thereof, such as a chassis, enclosure, subassembly, or other major component or part, i.e. to work in process. In addition, a smart tag ST may be attached to additional components or parts such as expensive or critical parts or materials, or to the containers, packages, crates, containers, pallets, or "tote" (tote box or container) or other container containing such parts or components.

Containers. packages and "totes" with smart tags ST attached may be reused, e.g., after erasing the product-specific and operation-specific information stored in its memory EM. Smart tags ST attached to product may either remain with the product or may be removed and, if desired, erased and reused. Smart tags remaining with product may be useful to facilitate servicing in the field, and/or for subsequent use or manufacturing or other operation in conjunction with smart tag readers/writers compatible with smart tag ST.

At each station OS-1-OS-4, the following information is recorded (communicated and stored) in both the smart tag ST associated with the product (article A) and the processor LC, 200: Control unit CU typically provides for the recording of product A arrival time and the operator and operation process code, and a derived or "as-built" bill of material or parts list. If station OS is a "kiosk" type including a keypad/keyboard providing data entry capability, the operator can input information such as extra material used, special observations or choices made and various defects, any issue or information the operator desires to record, and the like.

Preferably, at each station OS, similar information is stored in the electronic memory EM of the smart tag ST associated with the article A at a given station OS by the smart tag control unit reader/writer CU associated therewith and communicated to the processor LC, 200. Where the time of processing or an operation is important, antenna arrays 130 with entrance and exit "gates" may be utilized.

Where movement of product is relatively quick, i.e there is a short travel time between adjacent stations, antenna arrays 130 may be placed between stations OS. Each antenna array 130 in effect serves as an exit gate for one station OS-n and an entrance gate for the next station OS-(n+1), and process time at any station or stations OS may be obtained by subtraction of the times the article A is at each of the various antenna arrays 130.

Smart tags ST' that are different from smart tags ST associated with the articles A may be provided so that smart tag control unit CU at a station OS can monitor information contained in smart tag ST'. Smart tags ST' may be different in form from smart tag ST in that the antenna ANT and memory EM are embodied in an operator or employee identification badge or card (e.g., a smart card) or other convenient form. Smart tags ST' are different in function in that they are at least differently coded so that smart tag control units CU and processor LC, 200 differentiate them from smart tags ST associated with articles A to be tracked.

Where smart tags ST' are employee or operator or other individual identification, system 10 may obtain information from smart tag ST' such as operator identification, an employee number or serial number, as well as other information pertaining to the individual or of interest to management, and can process that information as part of the tracking record associated with an article A, such as tracking which operator performed each operation on a particular unit of product and when the operation was performed and how long it took. Such smart tags ST' are also preferably of the wireless type so that communication with smart tag control units CU does not require contact or a line-of-sight communication path.

In addition, where such individual identification smart tags ST' are utilized, they may additionally be read and/or written to by one or more smart tag control units CU at locations other than operation stations OS, such as at entrances and gates to a facility or a particular work area, for purposes of obtaining time and attendance information (i.e. time-clock information) concerning the individual to whom the smart tag ST' is issued. Such time and attendance information may also be tracked or otherwise monitored by processor LC, 200, and in conjunction with salary and labor rate information be used to track and monitor product cost, production cost, job and order cost, and other costs.

Detection of the presence of an individual's smart tag ST' may also be utilized to provide work orders, special instructions, notices, and other information to the individual. Antenna arrays 130 for detecting individual smart tags ST' may be located in locations other than a station or operation area OS. In addition, information stored in the individual's smart tag ST' may represent whether or not the individual is authorized access to a particular station, operation or area, and so may be utilized to open a door or gate, release a lock or interlock, enable operation of apparatus and/or equipment and otherwise interact with the smart tag control unit CU and other components of system 10, e.g., to manage an employee. Where the smart tag ST' is not one authorized to be in a particular station, operation or area, that information may be recorded and system 10 may give an appropriate warning and/or may signal management.

Smart tags ST' may also be associated with the parts, components and/or units of material used in an operation at a given station OS-n. In such case the identification and quantity of such part, component and/or material utilized with a particular article A-n is tracked from the information obtained therefrom via smart tag control unit CU-n associated with the given station OS-n and subsequent stations OS-(n+1), OS-(n+2) and so forth. This facilitates automatic production of actual or "as-built" bills of material for each unit of product or article A.

In addition to such tracking and monitoring of parts, components, materials, and work in process on an essentially real-time basis, rates of usage, inventory and replenishment ordering may also be controlled, such as for "just-in-time" and similar purchasing and inventory managing. Further, excessive usage, process inefficiency and theft may be uncovered. With operator entry of information at a given station OS via a keypad or keyboard, explanations of excess material usage, materials substitutions, and the like can be utilized to reduce discrepancies and/or inconsistencies between the actual bill of material and a theoretical or planned bill of material.

FIG. 2 also illustrates the use of the present arrangement is subsequent operations of different kinds with compatible smart tag readers and/or writers. When article A has moved along the path indicated by arrow 140 and leaves station OS-4 passing through antenna array 1304, path 140 splits, for example, in two or more possible different directions 142, 144. These directions may lead to any conceivable use or disposition for articles A. Examples include storage, distribution, exhibition or display, sales, shipping or transport, and the like.

Direction 142, for example, leads to a warehouse WH or other storage or distribution facility in which articles A-1-A-N are stored, e.g., as inventory. Within warehouse WH are various storage areas SA of two SA-1, SA-2 are illustrated. Storage areas SA may be physical floor spaces, shelving units, cabinets, racks or bins and the like. As illustrated, articles A-1 and A-2 having smart tags ST-1 and ST-2, respectively, thereon are in storage area SA-1 and articles A-3 and A-N having smart tags ST-3 and ST-N, respectively, thereon are in storage area SA-2.

Each storage area SA is preferably provided with an antenna array of similar type to arrays 130 that detect smart tags ST associated with the articles A therein irrespective of their orientation, i.e. all-orientation RFID antenna arrays. The antenna arrays of each storage areas SA coupled to a smart tag control unit CU and to a processor LC, 200 (i.e. either a central processor or a combination of central and local processors) as described above in relation to FIG. 1.

Thus, warehouse WH comprises a system 10 like that described above, and similar to that described in relation to manufacturing with respect to FIG. 2. In addition to array antenna 130 associated with storage areas SA, a similar all-orientation antenna array can be provided at the entrance(s) to and exit(s) from warehouse WH so that articles arriving and leaving are monitored and tracked. Such entry and exit antenna arrays are suitably sized for passage of personnel, packages, containers, pallets, carts, forklifts, and other objects intended to pass through such entrance or exit.

This not only facilitates reconciliation of inventory total quantity and identity with information of identity, quantity and location read from the smart tags ST in each storage area SA, but facilitates the detection of unauthorized moving or removing of articles A. In addition, this capability also facilitates the handling of time-sensitive articles (those that spoil, degrade or expire with passage of time) on a first-in first-out basis to minimize spoilage and of expiration.

Warehouse WH is but one example of a location or application for the present system. Location WH could be, for example, a cargo vessel (ship) having many cargo containers SA in its hold, an airplane having many baggage containers SA in its baggage compartment, a train having many cars (boxcars, refrigerated cars, auto carrier cars) SA, a truck or other vehicle having plural cargo zones SA, a store having many display units or shelves SA, and so forth. In addition to storage areas or zones SA, any of the foregoing may include antenna arrays at various access ways, such as entrances and exits to such areas and zones SA, as may the facilities at which they are loaded or unloaded, so that the location and time at which particular articles and/or containers were loaded and/or unloaded is recorded, tracked and monitored.

In addition, where smart tags ST, ST' are attached to or associated with containers, crates, pallets and the like that are reusable, such containers, crates, pallets and the like can be tracked and monitored by the smart tags ST, ST' thereon for loss prevention and more efficient utilization.

Thus it is evident that the same system elements may be configured to provide a system in accordance with the present arrangement in any one of many types of facilities, locations, functions and operations.

For example, when system 10 is utilized in a store or retail sales environment, such as where inventory status is desired, the stations have different names and functions (operations), but operation of the system is as described above. With regard to FIG. 2, station 1 (OS-1) could, for example, be a receiving dock, station 2 (OS-2) could be storage bins in a stockroom, storeroom or warehouse, station 3 (OS-3) could be display racks and shelves in a customer area, and station 4 (OS-4) could be the checkout station.

Merchandise to be sold (i.e. articles A) arrives at receiving dock OS-1 (station 1) either already tagged with smart tags ST or is tagged upon arrival. If articles A are tagged when they arrive, then it is desirable to have an antenna array entrance gate 130 through which the articles pass to get to the receiving dock OS-1 so that the smart tags ST thereon are read and information pertaining to the articles is recorded as an inventory record. The operation of station 1 is receiving.

The smart tags ST applied may be adhesive tags that adhere to the articles A or may be included in a relatively large conventional reusable circular anti-theft devices of the sort available from Check-Point Systems of Thorofare, N.J., typically utilized in retail clothing stores. These conventional anti-theft devices are large so as to be obvious and cannot be removed from the article without damaging the fabric or other material from which the article is made, unless removed using a special tool or release device generally not available to the public. Typically, a smart tag ST employing an I-CODE semiconductor chip from Philips is configured in form to fit inside such conventional anti-theft device so that the anti-theft-device and the smart tag ST cooperate to reduce theft and lost or misplaced merchandise (articles).

If the articles do not come with smart tags, then smart tags ST are affixed to the articles before the articles A are moved to the stockroom or storeroom OS-2 (station 2). In either case, articles A are moved to the stockroom OS-2 (station 2) passing through antenna array 130-1 along the path indicated by arrow 140, whereby information read from smart tag ST is recorded as an inventory record in processor LC, 200. Station 2 may include a plurality of storage bins or spaces similar to areas SA-1, SA-2, . . . , each having an all-orientation antenna array 130, so that the location, quantity, identity and other information regarding the articles A stored therein may be ascertained at any time by utilizing the antenna arrays 130 associated with such bins SA to read the smart tags ST associated with the articles A stored therein.

The preferred smart tag ST for such retail application is an RFID "passive" tag operating at 13.56 MHZ or another common RFID tag frequency. The memory of the electronic device of smart tag ST can be partitioned to contain required information for inventory purposes, such as the universal product code (UPC), the specific manufacturer, make or brand name, the specific model or type, the specific piece, pricing, date of receipt, and other relevant and/or desired or useful information.

Station 3 (OS-3) is the retail display space, showroom or other area where customers may inspect and/or select articles A for purchase. The operation of station 3 is merchandise display, whether the customer actually purchases the articles A displayed or makes a selection from the articles displayed and receives an article A from the storeroom OS-2 (station 2). Articles A moving out of storage area OS-2 (station 2) pass through the detection area of antenna array 130-2 and the smart tags ST associated therewith are read and the information read is used to create a record of the article A leaving the storeroom OS-2. Sections of the display shelves, display cases, showroom areas and the like are fitted with antenna arrays 130-3, which can be built into attractive decorated display shelves to show the articles advantageously for customer selection, so that the identity, type and quantity of articles in the showroom/retail space is always available by reading the information from the smart tags ST associated therewith.

An all orientation antenna array 1304 is also incorporated into the checkout counter OS-4 (station 4) at which purchases are recorded, tabulated and where the customer pays by cash, credit card or other method of payment. The operation of station 4 is order tabulation and payment. As articles A with associated smart tags ST pass through the detection region of antenna array 130-4, each is read and the information therefrom is communicated to the computer LC or 200 which tabulates the purchases automatically and quickly, and at the same time updates the inventory records to reflect the sale of those specific articles. Once the articles are paid for, the anti-theft devices with smart tags ST therein may be removed from the articles A purchased or the electronic memories of the smart tags associated with the articles A purchased may be erased or may be coded to indicate they have been purchased, so that they will not set off an anti-theft alarm as the articles are taken from the store.

A display (not shown) may be associated with checkout station OS-4, such as an LED, CRT, LCD or other display to display information regarding a particular sale/purchase for the employee and customer. If the store has a so-called "loyalty" program that awards "points" or other representations of purchases made (similar to airline frequent flyer and hotel frequent guest loyalty programs) for which the customer is issued a smart card (similar to a smart tag, but in the form of a card, usually about credit-card size), antenna array 130-4 associated with checkout station OS-4 can also read the customer's loyalty program information from the customer's loyalty program smart card and then credit the customer's loyalty program account for the purchases made and write the current updated information to the memory of the customer's loyalty program smart card. The customer information read from the loyalty program smart card may also be used to display a greeting to the customer by name on the display and/or to greet the customer aurally suing a speech synthesizer.

As described herein, the antenna of the all-orientation antenna arrays 130 are preferably either spatially separated or temporally separated by being activated sequentially in time to eliminate interference, and a single control unit CU therefor may control and operate a plurality of all-orientation antenna arrays 130. It is noted that the use of an antenna array 130 that has the ability to detect smart tags ST in its detection region with substantially 100% reading rate, as is the case for the all-orientation antenna array 130, is important to obtain full the advantage of the present arrangement. Typically, substantially 100% reading rate means at least a reading rate of about 99%, and preferably a reading rate of about 99.5%, irrespective of the orientation of the smart tag within the detection region of the antenna array. It is noted that variations in the antenna and/or smart tags and/or control units, such as variations due to component, production, adjustment, tuning, matching and other tolerances, and variation over time and temperature, as well as any other sources of electromagnetic radiation incident on the antenna, may produce variation of those percentages.

In addition, if store employees are issued individual smart tags ST', then transactions may be associated with particular employees to monitor performance quality and deter theft. The employee operating checkout station OS-4 can be associated with each sale and article A sold, and checkout station OS-4 can be arranged to be non-functional and/or to register an alarm if the smart tag ST' of the assigned employee is not within a prescribed distance (e.g., about 2-5 feet or about 0.6-1.6 meters) of that station when articles a are passed therethrough.

Advantageously, checkout counter OS-4 employing antenna array 130-4 is more efficient and should be quicker and less prone to error than are conventional bar-code scanning check out systems which require the article to be in close proximity to and in line-of-sight communication with the bar code scanner, and yet have a significant error rate. In addition, a complete and accurate inventory covering each area and aspect of the particular retail operation is available in real time and with an extremely low error rate, which is aided by the all-orientation antenna arrays.

Also advantageously, because the same devices and infrastructure for communication and processing can be utilized for both anti-theft control and for inventory control operations, the cost should be less than if different systems were to be used for each operation. Moreover, an additional antenna array 130-4B (not shown, in addition to array 130-4A at the checkout) near the store exit may be added simply and with little additional expense, further enhancing anti-theft control.

Smart tags ST, ST' are typically utilized for tagging and electronically identifying articles by reading information stored in the electronic memory of the smart tag using contact-less radio-frequency (RF) transmissions. Available smart tags operate at RF frequencies between hundreds of kilo-Hertz (KHz) and several giga-Hertz (GHz). Typical frequencies for RF smart tags and smart cards (functionally the same but different in form) include 125 KHz, 13.56 MHZ, 915 MHZ and 2.45 GHz.

For the present smart tagging system and method, an electronic integrated circuit in the form of a semiconductor chip is connected to an antenna ANT on a substrate to serve as a tag. The semiconductor chip typically includes a processor and an electronic memory for storing information. Information stored in a smart tag can be read by a suitable smart tag reader and can be read and written to by a suitable reader/writer. The reader or reader/writer and the tag antenna are tuned suitably so that RF energy (electromagnetic fields and electrical signals) can stimulate the tag to emit a signal representative of the information (electronic codes or data) stored in the tag memory. Such contact-less RF tags eliminate the need for an electrical contact or a line-of-sight path for communication with the smart tag.

Suitable smart card/smart tag semiconductor chips include the I-CODE chip and the MIFARE chip, both available from Philips Semiconductors located in Eindhoven, The Netherlands, and the types SLE4442 or SLE4428 memory ICs available from Siemens of Germany. Also suitable are the "Tag-it" devices available from Texas Instruments of Dallas, Tex., the "Pico-Tag" devices available from Inside Technology of France, and devices available from Microchips of Phoenix, Ariz. Each smart tag/semiconductor chip must have sufficient memory for storing all of the information desired to be stored therein. Typically about 100-500 bytes is sufficient and one kilobyte is preferred.

Suitable smart tag reader/writers include the lead tracking apparatus available from Avante International Technology, Inc. located in Princeton, N.J., the Fast-Track system available from Escort Memory Systems located in California, the Interrogator Control Module available from Samsys Technologies, Inc. located in California, and the Memor 2000

RFID available from Minec company located in Taby, Sweden, as well as readers/writers available from Intermec Technologies Corporation located in Everett, Wash., Fargo Electronics, Inc. located in Eden Prairie, Minn., or from Atlantek, Inc. located in Wakefield, R.I., or from Avante International Technology located in Princeton, N.J.

Suitable processors (both local processor LC and central processor 200) include any modern personal computer (PC), such as those having a Pentium®, Celeron®, or similar processor, running a Windows, Unix or other PC operating system. Where a LAN or WAN network is employed, standard PC networking hardware and software may be included in the PCs. Desirably, the processors, as well as the smart tag control units readers/writers, will have redundant memory and information storage, such as by one or more of non-volatile memory, a hard disk drive, a floppy disk drive, a CD-write drive and the like.

Applications programs suitable for recording and manipulating the information include relational database software such as the Windows-NT-based Microsoft ACCESS database as well as ORACLE, SYBASE and INFORMIX database software, and software languages such as Visual Basic, Java, or other language compliant with American National Standards Institute (ANSI) Standard 256. Each database record will typically include fields some or all of the following information: The article identification and/or serial number and/or quantity, station and/or operation identification, entry and exit time data (arriving and leaving), date, bill of material data, actual/planned material usage, keypad/keyboard entered data, component/part/material smart tag information, operator/employee/individual smart tag information, quality control and inspection data, transport provider, and the like. Thus, the database maintains an inventory of the articles, their quantities and locations and may be utilized to categorize the data contained in the database records for tracking any article or any type or group of articles, and/or any station so also provide status and inventory by station, operator or any other desired category of the stored records. Typically, the database software interfaces with other standard software, such as the standard MRPII software available from the Great Plains division of Microsoft Corporation of Redmond, Wash.

Desirably, processed information and/or transactional information should be available in human readable form, such as by display on a computer monitor or by print out by a computer printer, both of which may be conventional. Where certain information recorded and/or processed is representative of parameters or conditions that may pose a hazard to personnel or property, or are critical to an operation or process, or indicate a failure of some test or condition, it is desirable to include an alarm, such as a loudspeaker, flashing light, buzzer or the like, that is activated automatically by an out-of-limit or marginal condition.

Figure 3:
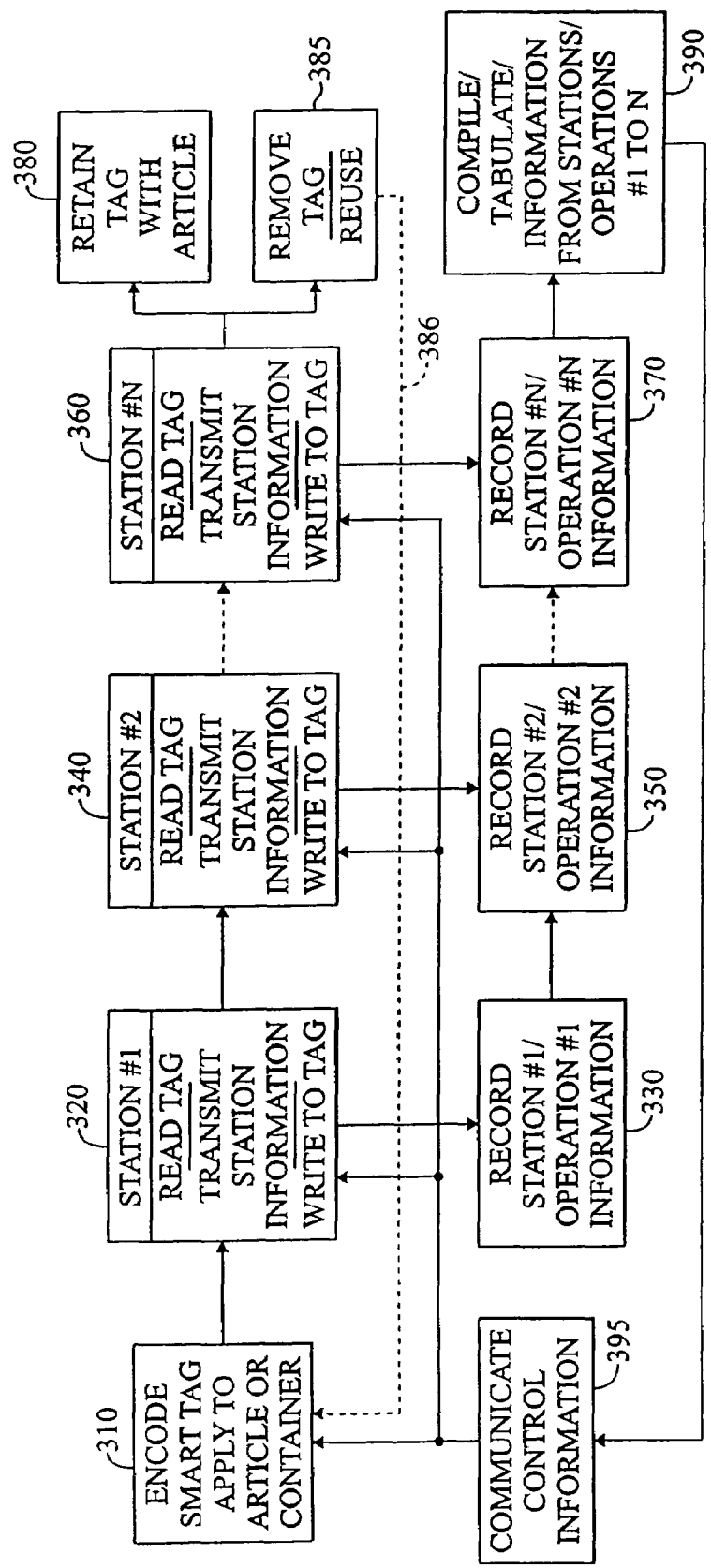
FIG. 3 is a flow chart schematic diagram of an example of a tracking system according to the present arrangement.

FIG. 3 is a flow chart schematic diagram of an example of a tracking system 10 according to the present arrangement, such as that described above in relation to FIG. 1 and/or FIG. 2. Step 310 comprises obtaining a smart tag and encoding into its electronic memory (storing) information identifying the article (e.g., product) to which it will be attached and other desired information, such as model number, serial number, date, manufacturer, plant or facility or manufacturing line information and the like. The smart tag is then placed on or with the article, or on or with the container containing or to contain the article(s), such as by adhesive or other mechanical attachment or by placement in a pouch or envelope or holder.

One smart tag may be associated with each article, or a smart tag may be associated with more than one article, e.g., as when a container contains plural articles. In the following, description in either the singular or plural is intended to encompass the other, without distinguishing whether the smart tags and articles are associated on a one-to-one basis or on a one-to-group basis.

Optionally, step 310 also comprises printing a conventional tag or label with all or part of the information thereon in human readable form and/or in machine readable form, such as a bar code where subsequent steps will be performed by both systems including the present arrangement and conventional bar code readers, i.e. a mixed environment.

Step 320 comprises the operation at station #1 which includes, in addition to the operation performed on the article, at least reading the smart tag to obtain the information stored in its memory. The information read from the smart tag is associated with station information, such as the identity of the station (station #1), the operation, the operator, time and date, materials and the like, which is typically stored at the station, inputted by an operator or read from other smart tags associated with material or parts used. The combined associated information is sometimes referred to as "transactional" information.

Optionally, but preferably, step 320 also comprises transmitting associated information (preferably the transactional information) to the smart tag and storing the information in its memory. Thus, both the smart tag and the station have the same transactional information pertaining to that article and that station. Any other desired information may likewise be transmitted and stored in the smart tag. Where plural tags may be present in the smart tag detection region of a station at the same time, conventional smart tag "collision-avoidance" or "anti-collision" techniques are employed.

Step 330 comprises recording the associated information (preferably the transactional information) pertaining to station #1 and operation # 1. Initially, such information is recorded in the smart tag control unit and/or a local processor, but is thereafter communicated to a processor, typically a central processor. The transactional information may include time and date information or time and date information may be associated with the transactional information in recording that information.

Step 330 further comprises communicating the information from the smart tag reader to the processor, either directly or via the control unit and one or more local processors. Steps 320-330 may also comprise communicating information from the processor to the smart tag.

Steps 340 and 360 are like step 320, but pertain to stations #2 through N rather than to station #1. Steps 350 and 370 are like step 330, but pertain to stations #2 through N rather than to station #1. As an article progresses through steps 320-370, information associated with the article and each station and operation is accumulated and recorded in the processor and is also preferably stored in the smart tag associated with the article. Thus, at the completion of steps 310 through 370, a record of the "history" of the article is recorded in the processor and preferably also in the smart tag.

It should be noted that stations #1 through N may include any number and types of stations and operations, as may be necessary, convenient or desirable in the processing, transport and use of any given article. The steps, and stations, need not be located in proximity to each other, but may be in separate buildings or facilities, at different locations and even widely dispersed geographically, and need not be under the ownership and/or control of any one person or entity.

Steps 380 and 385 are alternative steps. Step 380 comprises retaining with the article the smart tag in which is stored the historical transaction information relating to that particular article. The smart tag may be attached to the article or to packaging containing the article or employ another suitable associating arrangement. Step 380 also includes subsequently using the transactional information stored in the smart tag in conjunction with using or processing the article or another article including the smart tagged article.

Step 385 comprises removing the smart tag from the article, or removing the article from a smart tagged container, or otherwise disassociating the smart tag from the article. Step 385 may also include retaining the smart tag as a record of the history of the article. Alternatively, step 385 also may comprise erasing the information stored in the smart tag so that the smart tag may be re-encoded (step 310) for reuse.

Step 390 comprises compiling, tabulating, manipulating or otherwise processing the information recorded in steps 330, 350, 370 from stations #1-N regarding operations #1-N. Such processed information may be utilized for tracking, monitoring and/or control of a manufacturing or other process, and for control of that process and/or of apparatus, equipment, material, and personnel involved therewith. Step 390 may also include using such processed information for MRPII purposes, or for manipulation of data as part of a management information system (MS).

Step 395 comprises communicating information from step 390, i.e processed information, as control information for controlling apparatus and/or personnel involved in any of steps 310 through 370. Such control may include, for example, adjusting process conditions, material usage, control parameters, and the like, and may include programming instructions where a station includes a computer or computer-controlled apparatus or equipment.

The communicating of information in connection with any of steps 310-395 above may be accomplished by any suitable means including RF communication, optical communication, networks (LAN/WAN), and the like, as well as by wire, cable and optical fiber.

Figure 4A:
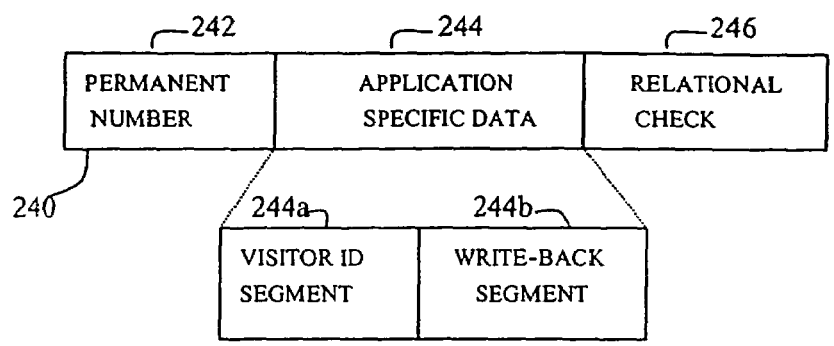
FIGS. 4A, 4B and 4C are schematic representations of memory allocations and relational database arrangements suitable for use with the present arrangement.

FIG. 4A is a schematic representation of a memory allocation 240 suitable for a smart card ST for use with the present arrangement. Sections 242, 244, 246 of memory EM of smart tag ST are allocated or segmented for the storage of particular information. Typically, an EEPROM memory is utilized.

Manufacturers of the electronic devices or chips utilized in smart tags typically segment the memory thereof into two segments: a first segment 242 into which the manufacturer burns in (i.e. permanently stores in a way that the information cannot thereafter be changed) a unique identifier of the electronic device or chip. Such permanent number 242 may be tens or hundreds of bits in length, as is appropriate for providing a unique identifier. The remainder of the memory capacity 244, 246 is left available for the storing of data therein in use, which data may be modified, written over or otherwise changed in the use of the electronic device.

Smart tags ST, ST' are typically utilized for tagging and electronically identifying objects by reading information stored in the electronic memory of the smart tag using contact-less radio-frequency (RF) transmissions. For the present smart tagging system and method, an electronic integrated circuit in the form of a semiconductor chip is connected to an antenna on a substrate to serve as a tag. The semiconductor chip typically includes a processor and an electronic memory for storing information. Information stored in a smart tag can be read by a suitable smart tag reader and can be read and written to by a suitable reader/writer. The reader or reader/writer and the tag antenna are tuned suitably so that RF energy (electromagnetic fields and electrical signals) can stimulate the tag to emit a signal representative of the information (electronic codes or data) stored in the tag memory. Such contact-less RF tags eliminate the need for an electrical contact or a line-of-sight path for communication with the smart tag.

While it is satisfactory to utilize only the stored permanent number identifier 242 to identify the smart tag containing the electronic device, it is preferred that the permanent number 242 be stored in a relational database in a processor and be linked to other identifying or use information for use in identifying the object or article to which the smart tag is attached or with which it is associated. Such processor is in communication with the smart tag readers that read information from memory 240 of the smart tags.

One potential problem associated with such smart tags occurs where the information desire to be stored therein is simply coded and written into the writeable memory 244, 246. In that case, any change to the information stored therein is undetectable. Typical sources of erroneous or corrupted or erased data include electromagnetic interference, whether accidental or intentional, as well as any intentional or unintentional attempt to modify the stored information, whether authorized or unauthorized, such as by a thief or counterfeiter. Having other than the correct data stored in the memory of the smart tag can lead to misdirection, loss or damage to property and/or injury to person, none of which is desirable or acceptable.

To reduce the likelihood of undetected erroneous stored information, the remaining memory 244, 246 available to the smart tag user is further segmented into two segments. The first segment 244, which is typically of greater memory capacity, is allocated for the storage of application specific data, such as the article identification, manufacturer, batch or lot identification and other information, 244*a*, and for information 244*b* that is written back to the smart tag memory by the smart tag reader/writer at the various stations, such as station identification, operation performed, date and time, and the like. The second and smaller memory segment 246 is allocated for storing a relational check number or code that is a calculated or coded value representative of at least the value of the stored application specific data, and preferably representative of the value of both the permanent number and the application specific data. Herein, the relational check number or code is usually referred to simply as the relational check number to include numbers and/or codes.

Where the smart tag includes processing capability, the processor can be programmed to calculate the relational check number upon each time data is written to its memory, preferably upon command to do so. Alternatively or additionally, each reader/writer or an associated processor or central processor can calculate the relational check number. Because the electronic device utilized in a smart tag has substantial memory capacity, the relational check number can include many bits and so can be constructed to permit error correction as well as error detection.

The foregoing arrangement permits detection of errors and/or changes to the application specific data at any time by reading the card and recalculating the relational check number which is then compared to the relational check number read from the smart tag. If the read and calculated relational check numbers match, then there is a high degree of certainty that the application specific data has not been changed and does not include errors.

It is noted that while the permanent number, the application specific data and the relational check number or code are referred to as "numbers," each may include numerical, alphabetic, alpha-numeric and other characters and symbols, conventional or arbitrary, as may be desired. The relational check number or code is representative of the information stored in the memory in accordance with a predetermined formula or algorithm or other scheme, either on a character by character basis or on the basis of one or more combinations of the characters or values stored in the memory. Suitable formula and algorithms include, for example, parity checks or other parity representations, sum checks, field relationship checks or any other predetermined relationship between the stored permanent number and application specific data values and the relational check number.

Thus, any change to the stored information, including a change that changes the stored value of the relational check number or code, will be detectable and an indication that the stored data contains one or more errors or changes. Typically, the particular formula or algorithm that generates the relational check number is not known to third parties and is not derivable from the data stored in the smart tag memory, and so the relational check number provides a degree of security for the information stored in the smart tags.

The formula or other algorithm or other encoder for generating the relational check code or number may be provided in protected firmware, in software or in a combination of firmware and software, to provide a higher level of security against deciphering or unauthorized coding. For additional security, each encoder may also include a unique identifier that must be paired with coding software having the same unique identifier for enabling proper functioning. The unique encoder identifier may also be included in or as part of the application specific data.

Figure 4B:
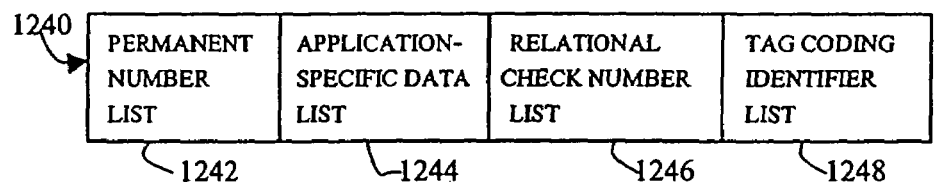
Figure 4C:
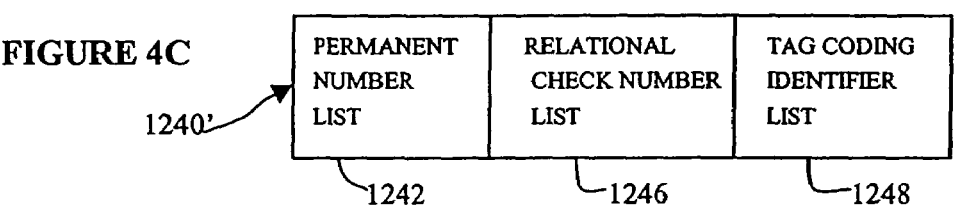

FIGS. 4B and 4C are schematic representations of memory allocations of a relational database of a processor suitable for use with the present arrangement. Database 1240 represents an aggregation of records stored in relational database computer software running on a processor. Compiling records of data written to smart tags in a relational database is particularly advantageous where the data is written to the smart tag and where it is important to be able to retrieve such data should the smart tag be misplaced, lost or stolen, or if the information stored therein is changed or corrupted or lost for any reason.

In a complete database, database 1240 illustrated by FIG. 4A stores a record each time data is written to any smart tag used with the tracking system. Database 1240 includes, for example, a number of data fields comprising a list 1242 of the permanent numbers of the smart tags, a list 1244 of the application specific data of each writing of application specific data to each smart tag, a list 1246 of the relational check number written to each smart tag with each writing of application specific data thereto, and a list 1248 of tag coding identifiers such as the date, time, reader/writer identification for each writing of application specific data to each smart tag. Lists 1242, 1244, 1246, 1248 are comprised of aggregations of records corresponding to each writing of information to each smart tag, and may be provided from one or both of the smart tag and the reader/writer utilized for each writing of information.

In a simplified database, database 1240' includes, for example, lists 1242, 1246 and 1248. This database arrangement may be advantageous where the database is stored in a local processor and/or a smart tag reader/writer where available memory capacity may be more limited than in another processor. In either a complete or simplified database, information relating to each writing of information to each smart tag is communicated to a processor in real time or delayed, and may be periodic or aperiodic. Information may be communicated by any of the means described as well as by manual communication, e.g., by transporting the smart tag reader/writer and/or local processor and/or computer media containing the information stored in such smart tag reader/writer and/or local processor to another processor.

Suitable relational database software include ACCESS and SQL Server database software which runs on conventional PC processors with standard operating systems, such as Windows-NT, both available from Microsoft Corporation of Redmond, Wash., as well as the ORACLE, SYBASE and INFORMIX database software. Preferably the database software is "Internet-ready" in that it includes features facilitating connection to and communication of information via the Internet.

Each database record will typically include fields for some or all of the following application specific data or information in addition to the permanent number:

Article information including but not limited to article or other product identification, name, model and/or serial number, UPC product code, customer and/or owner, batch, lot or shipment number and/or other identifying number, and the like.

Station and/or operation information including but not limited to booth/station identification, operator/personnel identification, entry and exit time data (arriving and leaving), date, expiration date, keypad/keyboard entered data, data item/information requests, quality control/inspection information, smart tag information, and the like.

Relational check number representative of any or all of the foregoing application specific data and/or the permanent number of the smart tag.

Where the information written to each smart tag is all communicated to and stored in a central database and where all subsequent action to be taken will be taken based upon the information stored in the central database, then the use of a relational check number to verify the information stored in the smart tag and/or detect errors in and changes thereto is of much less importance.

In any case, the central database can be utilized to provide particular information, general information, status information, statistical information, and other information on an on-line basis that is at least as current as the entry of record information into the database. Where every writing of information to a smart tag is also replicated in a record stored in the relational database, the relational database contains and can provide a detailed history of the utilization of the smart tag, e.g., the path of the visitor's visit to the exhibition and the date and time of each visit to each booth as well as information requested or entered at each such visit.

Figure 5A:
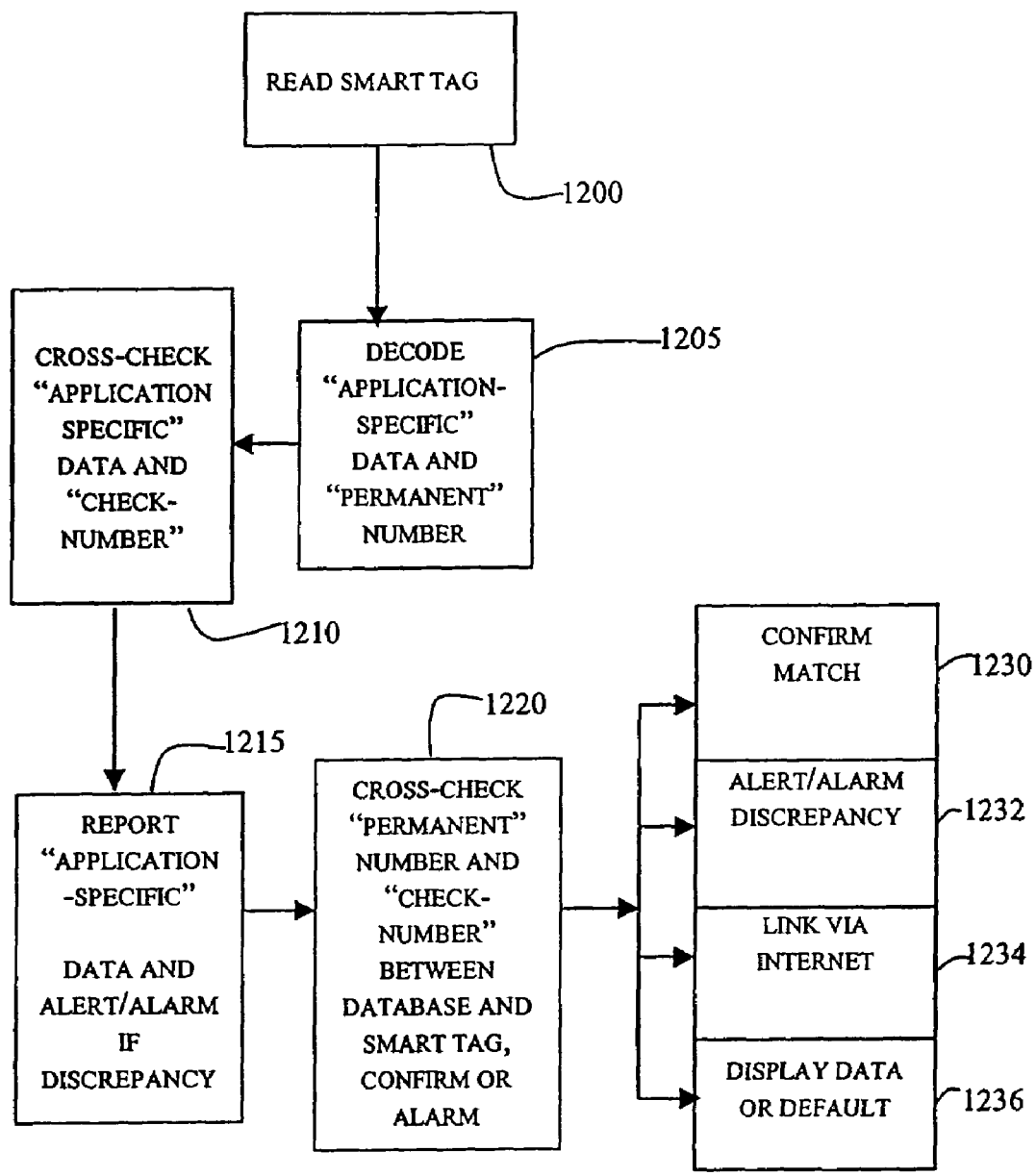
FIGS. 5A and 5B are flow chart schematic diagrams of examples of utilizations of the memory allocations and relational database arrangements of FIGS. 4A-4C according to the present arrangement.

FIG. 5A is a flow chart schematic diagram of an example of a utilization of the memory allocations 242, 244, 246, and of memory allocations and relational database structures 1242, 1244, 1246, 1248 of FIGS. 4A-4C according to the present arrangement. Information from the smart tag is read 1200, such information including, for example, a permanent number related to the particular smart tag, application specific data relating to the article and stations, and a check number representative of at least the application specific data and preferably the application specific data and the permanent number. Application specific data read from the smart tag is decoded 1205 and the permanent number read from the smart tag is stored.

A cross check 1210 is made between the application specific data and the permanent number read from the smart tag. Cross check 1210 includes calculating from the application specific data and the permanent number the value of the check number and comparing that calculated value to the value of the check number read from the smart tag. If the two check numbers correlate, then there is a high degree of confidence that the application specific data does not contain errors and has not been altered. It is noted that cross check 1210 is performed at least initially using only the information read from the smart tag and so does not necessarily require a central processor or database. If there is a non-correlation or other discrepancy, such non-correlation or discrepancy produces an alarm 1215 and further correlation steps may be taken.

Results of the reading of smart tags and of the correlation of the check numbers thereof are reported 1215 in any convenient form. Such reporting may be by aggregation of records in a database for current or delayed review, by displaying the results or summaries of results or statistics related to results on a human-perceivable display, or by initiating an alarm 1215 of lack of correlation of check numbers. Such alarm may take the form of a print out, a paper document, a visual display, a warning screen, an audible signal, a signal to a control or monitoring station or to a pager or cell phone, or any other convenient form of alarm or signal.

A further cross check 1220 may be made to check at least the permanent number and relational check number stored in the database to the permanent number and relational check number read from the smart tag. Because the permanent number of a smart tag cannot be changed, cross check 1220 includes comparing the relational check number read from a particular smart tag having a given permanent number with the relational check number stored in the relational database for the most-recent record corresponding to that given permanent number. Correspondence or lack of correspondence of the respective relational check numbers from cross check 1220 is utilized to confirm such correspondence or lack thereof by human-perceivable display or alarm, as described above.

In particular, correspondence in cross check 1220 initiates confirming a match 1230, e.g., by any human-perceivable display, report or alarm, as described above. Lack of correspondence in cross check 1220 is a discrepancy that initiates giving an alarm 1232, e.g., by any human-perceivable display, report or alarm, as described above.

Initiating a human-perceivable display or alarm, or communicating information to or from another location can include linking 1234 the processor performing any of cross checks 1210 and 1230 and/or producing a report or alarm 1215, 1230, 1232, to a remote processor, display or alarm via the Internet. Such linking via the Internet 1232 may include accessing a remote relational database, which may be an open database to which information can be added, deleted or changed or which may be a closed database not allowing information to be added, deleted or changed via the Internet link. Access may be controlled by access codes, passwords and the like as desired, and information communicated via the Internet may be encrypted, to provide the desired degree of security.

Further, correlation or lack of correlation or any other difference between the information read from a smart tag and the related information stored in the relational database initiates displaying 1236 data from any one or more of the smart tag and a local or central relational database, or if such data is limited or missing, displaying 1236 a default indication, e.g., whatever information is stored in the database. Displaying 1236 may include displaying information from the smart tag and the relational database or may be limited, e.g., to displaying the differences and/or discrepancies of that information, and may be immediate or delayed. Displaying 1236 may be for each cross check 1210, 1220, or may be for any number of cross checks 1210, 1220.

The display of the result or status of any step and/or of the information to which attention is to be drawn may be included in a display of information, e.g., such as by highlighting or coloring the portion of the displayed information to which attention is to be drawn, or by separately displaying the information to which attention is to be drawn. Where information desirable to be displayed is available in the relational database, such information is retrieved and displayed automatically, either locally, remotely or via the Internet, as appropriate. If such information is not so available, a warning or instruction to an operator is provided to instruct the operator to either retrieve the information or to segregate or mark the affected smart tag for special treatment or handling, e.g., such as alerting an attendant or operator at final or check out station when an article associated with that smart tag arrives.

It is noted that the foregoing arrangements and method also can enable the detection of changing or tampering with the information stored in the smart card for the unlikely case where the changing or tampering is done with knowledge of the calculation of the relational check number. In such case, the relational check number is correctly related to the application specific data and/or the permanent number and so the simple cross checking 1210 will not detect the changing or tampering. Because the information written to each smart tag is also stored in the relational database correlated to the smart tag unchangeable permanent number, comparison of the changed or tampered-with information read from a smart card is detectable by cross checking 1220 that read information against the information stored in the relational database.

Where desired, the relational database may be accessed and made available by any convenient means, e.g., by providing same on floppy disk or CD-ROM, optical CD and the like that is easily sent by mail, express and the like, or by making same available via communication means such as wire, cable, optical fiber, LAN, WAN, optical or radio frequency transmission, the Internet and the like.

Figure 5B:
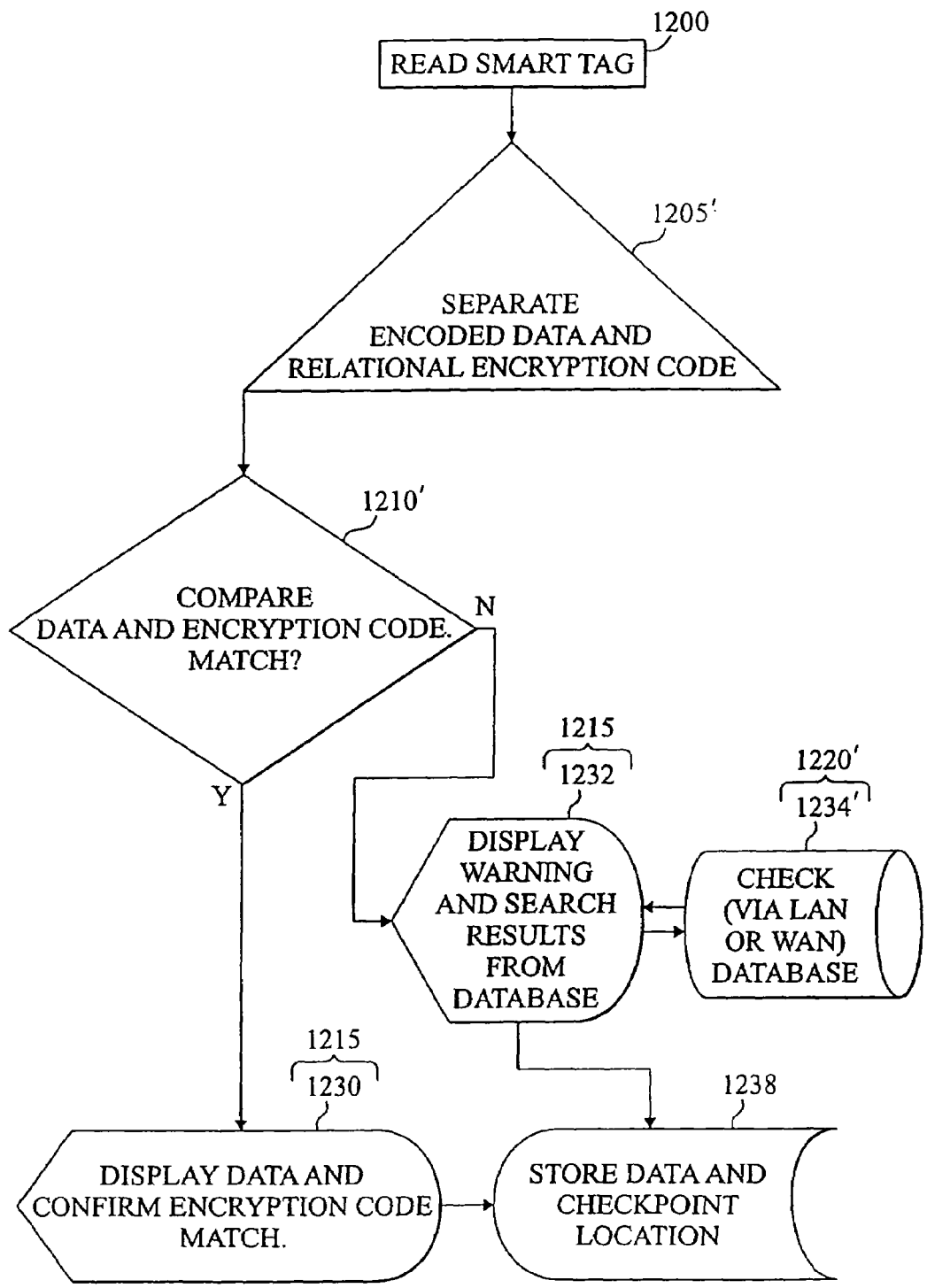

FIG. 5B is a flow chart schematic diagram of another example of a utilization of the memory allocations 242, 244, 246, and of memory allocations and relational database structures 1242, 1244, 1246, 1248 of FIGS. 4A-4C according to the present arrangement. It is noted that the steps of FIG. 5B include steps as described above in relation to FIG. 5A, but arranged for a more direct illustration of certain steps. Information from the smart tag is read 1200, such information including, for example, the permanent number related to the particular smart tag, application specific data, and a relational check number (also referred to as a "relational encryption code") representative of at least the application specific data and preferably the application specific data and the permanent number.

The encoded application specific data and relational check number read from the smart tag are decoded and separated 1205' and are compared 1210' to determine whether the relational encryption or check code or number read from the smart tag corresponds to or matches the relational encryption or check code or number recalculated by the processor from the application specific data and the permanent number read from the smart tag. I.e. match 1210' is a cross check that includes calculating from the application specific data and the permanent number the value of the relational check number and comparing that calculated value to the value of the check number read from the smart tag.

If the two check numbers correlate (i.e. match, path "Y"), then there is a high degree of confidence that the application specific data does not contain errors and has not been altered, and the application specific data is displayed 1215/1230 along with confirmation that the relational check number correlates.

If there is a non-correlation (i.e. non-match, path "N") or other discrepancy, such non-correlation or discrepancy produces the display of a warning or alarm 1215/1232 and initiates further correlation steps. Such further steps include retrieving 1220'/1234' from a relational database records stored therein corresponding the particular smart tag related, for example, by its permanent number, and displaying or posting 1215/1232 such retrieved stored records. Access to the relational database, if not direct in the processor, is by communication 1220'/1234' with a processor via communication means, typically a LAN or WAN, or via the Internet.

Whether there is correlation or non-correlation of the relational check number, a record is stored 1238 in the relational database including the information read from the smart tag in step 1200, whether or not the read data correlated or not in step 1210', and the identity of the station or check point at which such data was read.

Figure 6:
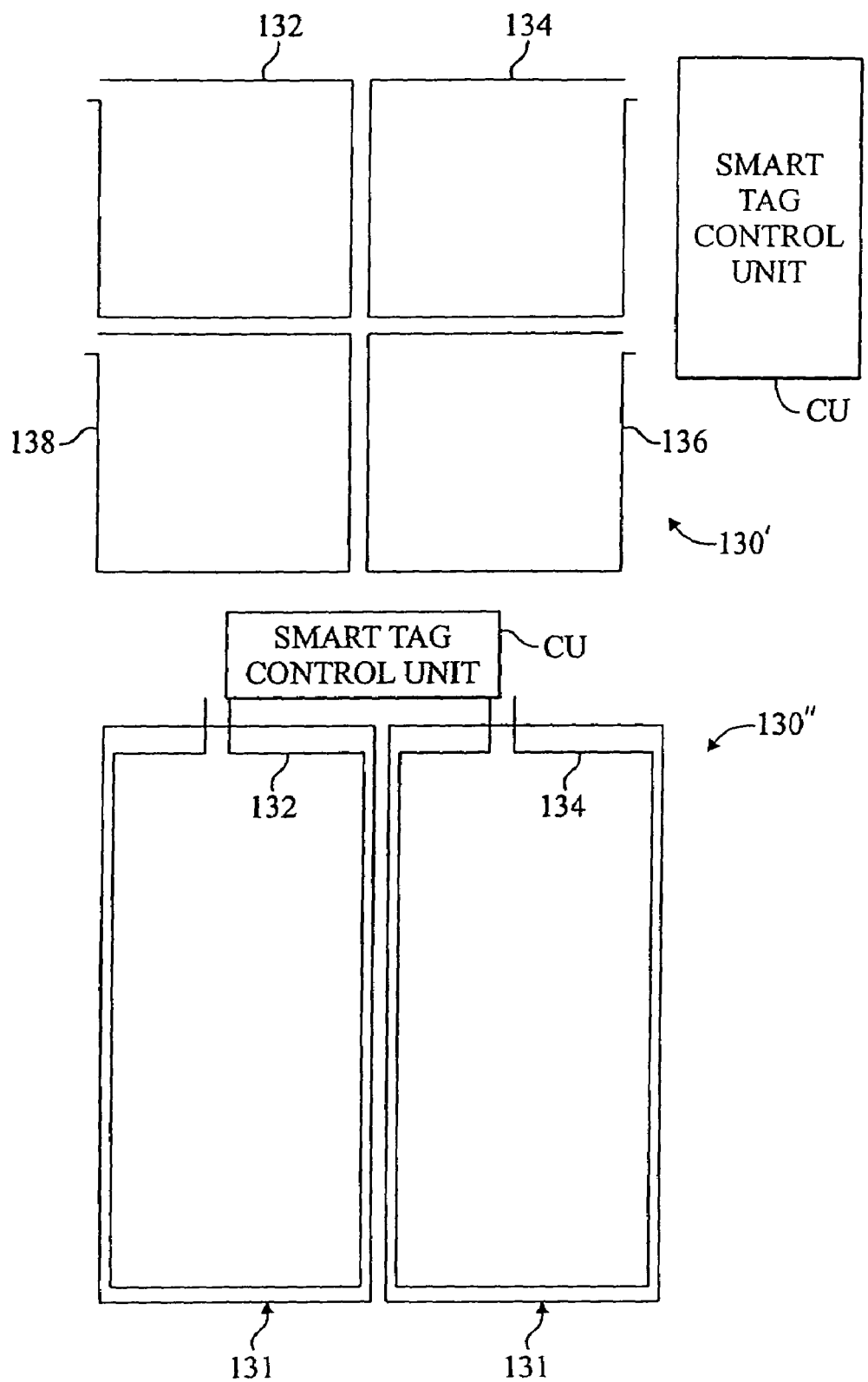
FIG. 6 is a schematic diagram of examples of antenna suitable for use with the present arrangement.

FIG. 6 is a schematic diagram of examples of antenna arrays 130 (designated 130' and 130") suitable for use with the present arrangement. Each antenna array 130 comprises a plurality of antenna 132, 134, 136, 138, . . . disposed or arrayed in respective orientations so as to produce, when transmitting, an electromagnetic field in the detection region having components in each of three orthogonal directions, and so as to be responsive to, when receiving, an electromagnetic field in the detection region having components in each of three orthogonal directions. Because each array 130 includes a plurality of antenna, preferably loop antenna, 132, 134, 136, 138, . . . , the antenna may be conveniently be attached to and supported by existing structure at each station OS or entrance or exit, or may be supported by a supporting structure provided for that purpose. Typically, the antenna 132, 134, 136, 138, . . . of the antenna array 130 are spaced apart and are disposed to surround the space defined as the detection region.

Because the relevant electromagnetic field has components in each of three orthogonal directions, communication between at least one of the antennas 132, 134, 136, 138, . . . of the antenna array 130 and the antenna of a smart tag ST, ST' in the detection region is possible regardless of the orientation of the smart tag. As a result, there is a high degree of confidence that information is correctly from read from and/or written to the tag or tags ST, ST' present in the detection region. Such antenna array is sometimes referred to as an "all-orientation" antenna array.

In particular, the antenna array 130' at the top of FIG. 6 includes four antenna loops 132, 134, 136, 138 coupled to smart tag control unit CU for reading information from and writing information to a smart tag ST, ST'. The four antenna loops 132, 134, 136, 138 may be disposed in planes defining the sides of a parallelepiped-shaped detection region, preferably with at least one of the loop antenna disposed so that the smart tag ST, ST' moves through the central region of the loop. The antenna loops 132, 134, . . . may be crossed one over the other or over itself so as to have conductors that appear to form a "net" or that appear to be "knitted" and one or more of the loops may be skewed at an angle of about 45° to 135° with respect to one or more of the other loops.

Figure 7A:
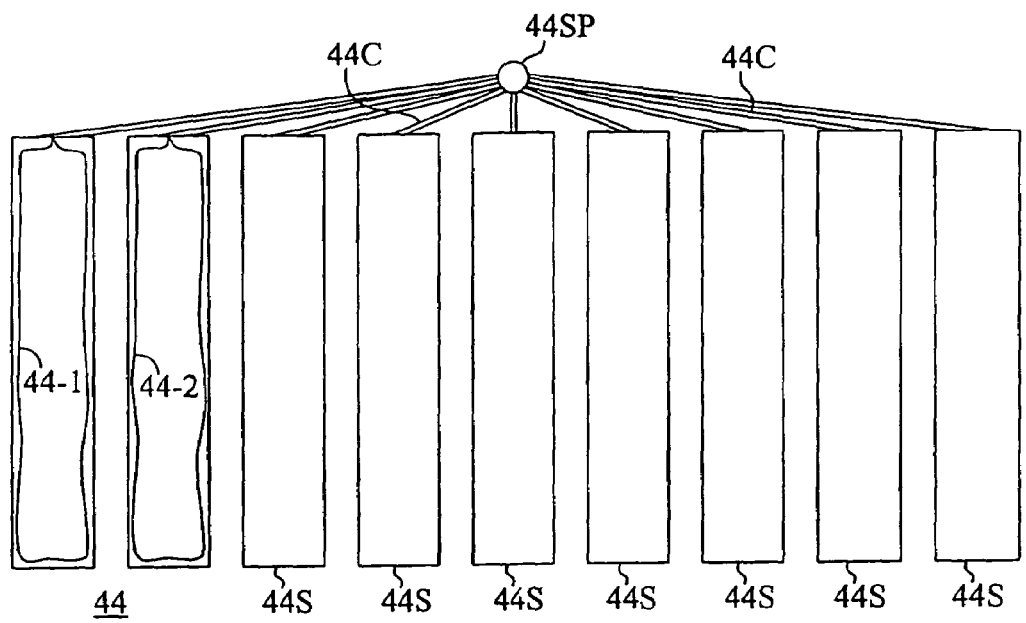
FIGS. 7A, 7B and 8 are schematic diagrams of examples of antenna arrays suitable for use with the present arrangement.

The antenna array 130" at the bottom of FIG. 6 includes a plurality pf antenna loops 132, 134, . . . (only two shown) coupled to smart tag control unit CU for reading information from and writing information to a smart tag ST, ST'. The plural antenna loops 132, 134, . . . are disposed on flexible plastic planar sheets 131 that are hung together side by side as a segmented flexible curtain to cover the opening of an entrance, exit or other access way that defines detection region, for example, as illustrated by FIG. 7A. Antenna loops 132, 134, . . . are coupled via coaxial cables 130C to splitter 130SP for coupling electrical signals thereto. It is noted that because antennas 132, 134, . . . are on flexible plastic substrate segments 131, they also provide a cover for the access way similar to conventional plastic doorway curtains.

Figure 7B:
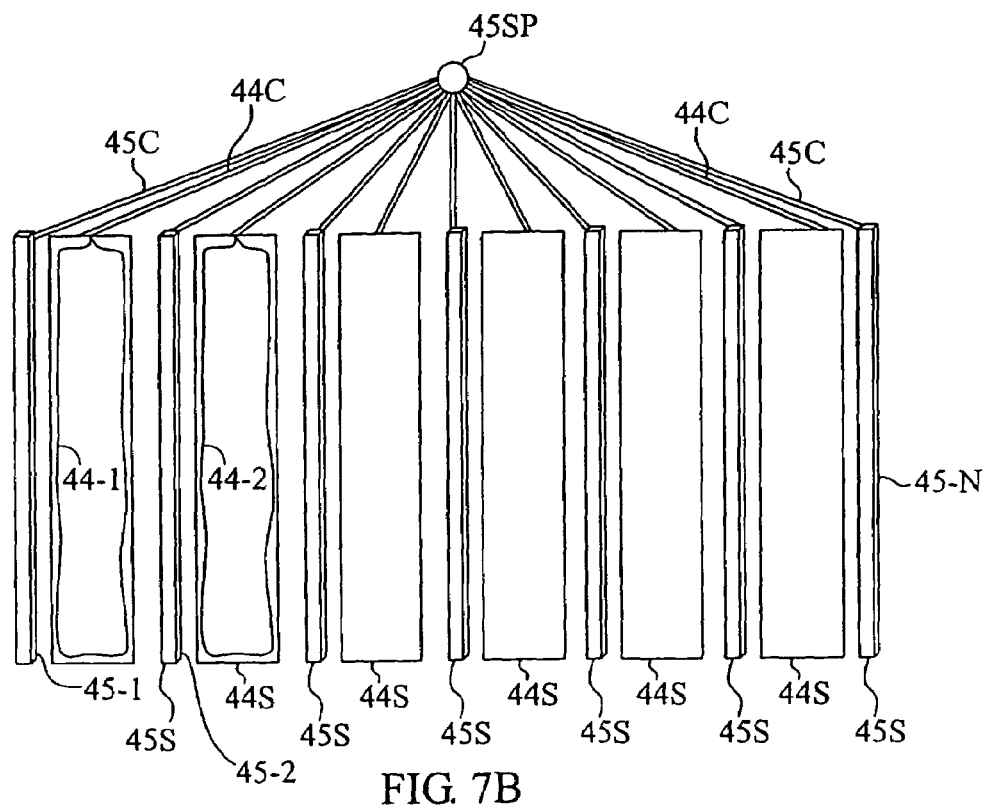

As illustrated in the antenna array 1130 shown in FIG. 7B, additional similar loop antenna 1132, 1134-2, . . . disposed on additional flexible plastic sheets 1131 hung in between (alternating with) and substantially perpendicular with the sheets 131 that form a curtain. Antenna loops 1132, 1134, . . . are coupled via coaxial cables 1130C to splitter 1130SP for coupling electrical signals thereto. Sheets 1131 may or may not intersect the plane that contains sheets 131. Loop antenna 1132, 1134, . . . improve antenna array 1130 operation under some conditions, but are optional. The flexible planar sheets 131, 1131 are parted and move when an article or articles pass through the access way so as to move ones of the loop antenna 132, 134, . . . and/or loop antenna 1132, 1134, . . . on the plastic sheets to different orientations so that at least one of the loop antenna becomes disposed to read information from and/or write information to smart tag ST, ST' as the article(s) move(s) through the access way.

To avoid interaction or interference between transmission and/or reception by the various ones of the antenna 132, 134, . . . and 1132, 1134, . . . of the antenna array 130 and 1130, the antenna 132, 134, . . . and 1132, 1134, . . . are loop antenna arranged with spatial or temporal separation. That is the loop antenna are typically spaced apart so as to be spatially separated or are activated and/or enabled sequentially in time so that one antenna is active (i.e. transmitting or receiving) at any given time and is independent of the others when active. Antenna sequencing and timing may be provided and/or controlled by control unit CU or by control unit CU in conjunction with one or more of processors LC, 200, and may be coordinated with other sequenced antenna arrays such as via a distribution hub 110 or other coupling path.

In the temporally separated loop antenna, the time in the antenna activation sequence for which any one antenna is active for transmitting and/or receiving information (i.e. the "dwell time") is typically between about 150 and 350 milliseconds. Antenna sequencing is established at a rate sufficiently high so that all of the antennas are activated within the minimum time that a moving article to be detected is within the detection region. Where individual smart tags ST' are utilized, one or more time slots in the antenna sequence may be dedicated to reading and/or writing to the individual smart tags ST'. The sequencing rate is typically about 0.5 to 2 complete sequences per second, so that the duration of each complete sequence (i.e. the "cycle time") is about 500 to 2000 milliseconds.

Where the antenna loops are spatially separated, either in place of temporal separation or in addition thereto, the spatial separation is typically sufficient when less than about 50% of the effective electromagnetic field region overlaps within the detection region.

Figure 8:
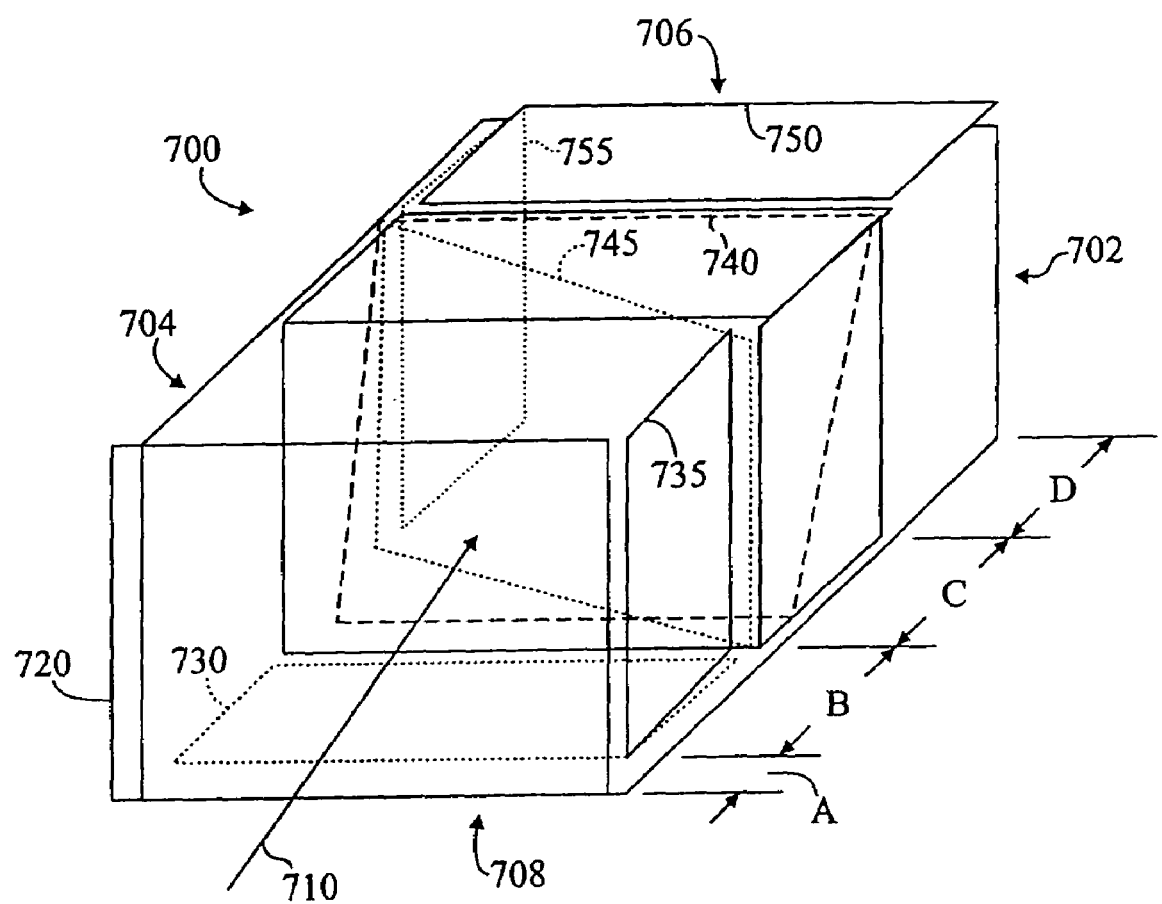

FIG. 8 is a schematic diagram of an example of an antenna array 700 suitable for use with the present arrangement. Antenna array 700 includes a plurality of loop antenna 720-755, disposed around and proximate to the transport path 710 of an object including a smart tag. Specifically, loop antenna 720-755 define a parallelepiped "tunnel" of passage having right and left sides 702 and 704, top 706 and bottom 708. One direction of travel is indicated by the arrow of transport path 710, but the opposite direction of travel may also be used. Antenna loops 720-755 are disposed in a plurality of spatially separated regions of antenna array 700 indicated by the letters A, B, C and D.

Antenna loop 720 is disposed in region A of antenna array 700 to surround transport path 710 so that the object including a smart tag passes through loop 720. Antenna loop 720 is optional where the smart tags are of sufficient size to sufficiently couple transmitted electromagnetic signals to others of antenna loops 730-755.

Antenna loops 730 and 735 are disposed adjacent to transport path 710 on bottom 708 and on side 702, respectively, in region B of antenna array 700. Loops 730 and 735 are substantially perpendicular (e.g., at about 80° to 100°) to each other so as to sufficiently couple transmitted electromagnetic signals as the object including a smart tag is proximate thereto. Similarly, but spatially separated therefrom, antenna loops 750 and 755 are disposed adjacent to transport path 710 on top 706 and on side 704, respectively, in region D of antenna array 700. Loops 750 and 755 are substantially perpendicular (e.g., at about 80° to 100°) to each other so as to sufficiently couple transmitted electromagnetic signals as the object including a smart tag is proximate thereto. Together, antenna loops 730. 750, 735, 755 are on the bottom, top and both sides 702, 704 to together surround transport path 710.

Antenna loops 740 and 745 are disposed to each surround transport path 710 in region C of antenna array 700, similarly to loop 720 of region A. Loops 740 and 745 are skewed or rotated so as to not be substantially perpendicular to transport path 710, but to be skewed at an angle of about 45° to 135' with respect thereto. Loop 740 is rotated or skewed in a direction about a vertical line and loop 745 is rotated or skewed about a horizontal direction so as to appear to lean or be tilted. As a result, loop antenna 740, 745 are disposed in skewed fashion so as to sufficiently couple transmitted electromagnetic signals as the object including a smart tag is proximate thereto in an orientation not likely to couple efficiently to, e.g., antenna loops 730, 735, 750 and 755. Antenna loops 740 and/or 745 are optional where the smart tags are of sufficient size to sufficiently couple transmitted electromagnetic signals to others of antenna loops 720-735 and 750-755.

While various temporally and/or spatially separated antenna array arrangements may be utilized with the present arrangement, examples of suitable antenna arrays are described in detail in Applicant's co-pending U.S. patent application Ser. No. 09/854,722 entitled "ANTENNA ARRAY FOR SMART RFID TAGS" filed on May 14, 2001, which is hereby incorporated herein in its entirety. Examples of typical smart tags suitable for use with the present arrangement are described and shown in Applicant's co-pending U.S. patent applications Ser. No. 09/412,058 entitled "ARTICLE HAVING AN EMBEDDED ELECTRONIC DEVICE, AND METHOD OF MAKING SAME" filed Oct. 4, 1999, Ser. No. 09/411,849 entitled "WIRELESS ARTICLE INCLUDING A PLURAL-TURN LOOP ANTENNA" filed Oct. 4, 1999, and Ser. No. 09/671,923 entitled "TAMPER-RESISTANT WIRELESS ARTICLE INCLUDING AN ANTENNA" filed Sep. 28, 2000.

While the present arrangement has been described in terms of the foregoing exemplary embodiments, variations within the scope and spirit of the present arrangement as defined by the claims following will be apparent to those skilled in the art. For example, many different combinations of antenna arrays, control units, communication devices and processors may be employed in making and using the system and in practicing the method of the present arrangement. Antenna arrays may be provided in any kind of area such as storage bins, containers, display cases and shelves, cargo areas and holds, as well as places whether or not described above.

The information communicated between smart tag, control unit and/or processor may include any information of interest to the proprietor or operator of the system or method. For example, the identity of the article is information often desired, and may include the model or type number, the serial number, the name or nomenclature, material and/or component information, order or contract number, and the like, and such information may relate to the article, the container carrying the article and/or an apparatus into which the article will ultimately be incorporated.

Smart tags of various types may be utilized as convenient. Where the operation may involve a harsh or severe environment, such as high temperature or pressure, chemical reactants and solvents, detergents and bleaches and the like, the smart tag is of materials compatible with that environment. For example, a smart tag having a polyimide substrate with solid copper conductors thereon and nickel-gold metal plated interconnection pads, and wherein the electronic chip is connected to the interconnection pads with a high-temperature flexible conductive adhesive, may withstand temperatures of about 200° C. for at least 100 hours. Such tags may be contained within a closed package or container that isolates the temperature rise of the smart tag to less than about 150° C. within 60 minutes, even when the temperature of the operation is over 300° C. Such package may also prevent chemicals and solvents from reaching and attacking the smart tag.

What is claimed is:

1. A method for tracking articles, managing articles, or both, wherein RFID tags are associated with the articles, comprising:

associating at least one RFID tag with an article, the RFID tag including an electronic memory containing information relating to the article and an antenna coupled to the electronic memory for transmitting and/or receiving information-bearing signals in an RFID tag format, wherein the information-bearing signals represent information to be stored in the electronic memory and/or represent information produced from the electronic memory;

associating at least one bar code with the article, the bar code containing information relating to the article that is stored in the electronic memory of the RFID tag and the electronic memory of the RFID tag containing the information that is encoded in the bar code;

providing a first station comprising a first RFID reader for transmitting and/or receiving information-bearing signals in the RFID tag format via a first antenna defining a detection region proximate the first station;

providing a second station comprising a second RFID reader for transmitting and/or receiving information-bearing signals in the RFID tag format via a plurality of antennas defining a detection region proximate the second station, wherein antennas of the plurality of antennas of the second station are sequenced in time at a rate sufficient for receiving information-bearing signals transmitted by an RFID tag within the time that the RFID tag is within the detection region thereof irrespective of the orientation of the RFID tag;

communicating information contained in the received information-bearing signals from RFID tags in the detection regions of the first and second RFID readers to a processor, whereby information is communicated between the electronic memory of RFID tags and the processor via the RFID tag readers of the first and second stations when the RFID tags are in the detection regions thereof; and storing in a database associated with the processor at least information contained in the received information-bearing signals, wherein the information stored in the database includes information relating to the articles, wherein the information relating to the article stored in the RFID tag is erasable and the RFID tag is re-encodable, whereby information stored in the database may be accessed for obtaining information relating to the articles and the RFID tags may be reprogrammed.

2. The method of claim 1:

wherein said providing a first station includes locating the antenna of the first station proximate a location at which articles are received, are stored, are inventoried, are displayed, are shipped, are dispensed, or any combination of the foregoing; or wherein said providing a second station includes locating the plurality of antennas of the second station proximate locations at which articles are received, are stored, are inventoried, are displayed, are shelved, are shipped, are dispensed, are checked out, or any combination of the foregoing; or any combination of the foregoing.

3. The method of claim 1 wherein the information relating to the article includes any one or more of: inventory information, universal product code (UPC), manufacturer, make or brand name, model, type, a specific piece, a serial number, a batch identifier, a lot identifier, an identifying number, pricing, date of manufacture, date of receipt, expiration date, or any combination thereof.

4. The method of claim 1:

wherein the electronic memory of the RFID tag contains information including any one or more of: inventory information, universal product code (UPC), manufacturer, make, brand name, model, type, a specific piece, a serial number, a batch identifier, a lot identifier, an identifying number, pricing, date of manufacture, date of receipt, expiration date, or any combination thereof; or wherein the electronic memory of the RFID tag includes information stored therein by a station relating to the identity of that station, to the operation performed at that station, or to both; or wherein the electronic memory of the RFID tag includes a relational check number representative of the information stored therein; or wherein the electronic memory of the RFID tag includes a unique permanent number associated with the RFID tag and a relational check number representative of the unique permanent number, of the information stored in the electronic memory, or of both the unique permanent number, and the information stored in the electronic memory; or wherein the RFID tag includes thereon in human-readable form, in machine-readable form, or in both forms, all or part of the information stored in the electronic memory thereof; or wherein the RFID tag is attached to an article and/or is attached to a container, package, crate, pallet, tote box, or other container containing the article;

wherein the RFID tag is resistant to tampering, enables detection of tampering, or both; or wherein the RFID tag is any one or more of tamper-resistant, tamper-destruct, tamper-evident, and high-temperature resistant; or wherein the RFID tag is removable for reuse; or any combination of the foregoing.

5. The method of claim 1 further comprising providing a human perceivable indication responsive to the information stored in the database, wherein said providing a human perceivable indication includes providing a light, an audible alarm, an anti-theft alarm, a display on a computer monitor, a print out, or any combination thereof.

6. The method of claim 1 wherein at least one of the first and second stations are associated with a warehouse, a manufacturing facility, a processing facility, a display, a display rack, a shelf, a storage area, a storage bin, an entrance, an exit, an access way, a transport operation, a vehicle, an airplane, a ship, a train, a truck, a container, a storage container, a transport container, a crate, a package, a pallet, a wholesale operation, a check out, a dispensing location, a retail operation, a store, a display facility, or any combination of the foregoing.

7. The method of claim 1 wherein the articles are of a sort that degrade, expire and/or spoil with passage of time, wherein the electronic memory of the RFID tag contains at least information from which a date of degradation, expiration and/or spoilage can be determined, and wherein the data base contains the information from which a date of degradation, expiration and/or spoilage can be determined, whereby articles can be dispensed on a first-in first-out or other basis to reduce spoilage.

8. The method of claim 1 further comprising erasing the information relating to the article RFID tag stored in the electronic memory of the RFID tag.

9. A method for tracking articles, managing articles, or both, wherein RFID tags are associated with the articles, comprising:

associating at least one RFID tag with an article, the RFID tag including an electronic memory containing information relating to the article and an antenna coupled to the electronic memory for transmitting and/or receiving information-bearing signals in an RFID tag format, wherein the information-bearing signals represent information to be stored in the electronic memory and/or represent information produced from the electronic memory;

associating at least one bar code with the article, the bar code containing information relating to the article that is stored in the electronic memory of the RFID tag and the electronic memory of the RFID tag containing the information that is encoded in the bar code;

providing a first station comprising a first RFID reader for transmitting and/or receiving information-bearing signals in the RFID tag format via a plurality of antennas defining a detection region proximate the first station, wherein antennas of the plurality of antennas of the first station are sequenced in time at a rate sufficient for receiving information-bearing signals transmitted by an RFID tag within the time that the RFID tag is within the detection region thereof irrespective of the orientation of the RFID tag;

communicating information contained in the received information-bearing signals from RFID tags in the detection regions of the first RFID reader to a processor, whereby information is communicated between the electronic memory of RFID tags and the processor via the RFID tag readers of the first station when the RFID tags are in the detection regions thereof; and storing in a database associated with the processor at least information contained in the received information-bearing signals, wherein the information stored in the database includes information relating to the articles, wherein the information relating to the article stored in the RFID tag is erasable and the RFID tag is re-encodable, whereby information stored in the database may be accessed for obtaining information relating to the articles and the RFID tags may be reprogrammed.

10. The method of claim 9:
wherein the electronic memory of the RFID tag contains information including any one or more of: inventory information, universal product code (UPC), manufacturer, make, brand name, model, type, a specific piece, a serial number, a batch identifier, a lot identifier, an identifying number, pricing, date of manufacture, date of receipt, expiration date, or any combination thereof; or
wherein the electronic memory of the RFID tag includes information stored therein by a station relating to the identity of that station, to the operation performed at that station, or to both; or
wherein the electronic memory of the RFID tag includes a relational check number representative of the information stored therein; or
wherein the electronic memory of the RFID tag includes a unique permanent number associated with the RFID tag and a relational check number representative of the unique permanent number, of the information stored in the electronic memory, or of both the unique permanent number, and the information stored in the electronic memory; or
wherein the RFID tag includes thereon in human-readable form, in machine-readable form, or in both forms, all or part of the information stored in the electronic memory thereof; or
wherein the RFID tag is attached to the article and/or is attached to a container, package, crate, pallet, tote box, or other container containing the article;
wherein the RFID tag is resistant to tampering, enables detection of tampering, or both; or
wherein the RFID tag is any one or more of tamper-resistant, tamper-destruct, tamper-evident, and high-temperature resistant; or
wherein the RFID tag is removable for reuse; or
any combination of the foregoing.

11. The method of claim 9 wherein the articles are of a sort that degrade, expire and/or spoil with passage of time, wherein the electronic memory of the RFID tag contains at least information from which a date of degradation, expiration and/or spoilage can be determined, and wherein the data base contains the information from which a date of degradation, expiration and/or spoilage can be determined, whereby articles can be dispensed on a first-in first-out or other basis to reduce spoilage.

12. The method of claim 9 further comprising erasing the information relating to the article RFID tag stored in the electronic memory of the RFID tag.

13. The method of claim 9 wherein the first station is associated with a warehouse, a manufacturing facility, a processing facility, a display, a display rack, a shelf, a storage area, a storage bin, an entrance, an exit, an access way, a transport operation, a vehicle, an airplane, a ship, a train, a truck, a container, a storage container, a transport container, a crate, a package, a pallet, a wholesale operation, a check out, a dispensing location, a retail operation, a store, a display facility, or any combination of the foregoing.

14. The method of claim 9 further comprising providing a human perceivable indication responsive to the information stored in the database, wherein said providing a human perceivable indication includes providing a light, an audible alarm, an anti-theft alarm, a display on a computer monitor, a print out, or any combination thereof.

15. The method of claim 9 further comprising:
providing a second station comprising a second RFID reader for transmitting and/or receiving information-bearing signals in the RFID tag format via a second antenna defining a detection region proximate the second station; and
said communicating further comprising communicating information contained in the received information-bearing signals from RFID tags in the detection regions of the second RFID reader to the processor, and
said storing further comprising storing in a database associated with the processor at least information contained in the received information-bearing signals received by the first and second stations, wherein the information stored in the database of the station includes information relating to the articles in the detection regions of the first and second stations.

16. A method for tracking articles, managing articles, or both, wherein RFID tags are associated with the articles, comprising:
associating at least one RFID tag with an article, the RFID tag including an electronic memory containing information relating to the article and an antenna coupled to the electronic memory for transmitting and/or receiving information-bearing signals in an RFID tag format, wherein the information-bearing signals represent information to be stored in the electronic memory and/or represent information produced from the electronic memory, wherein the articles are of a sort that degrade, expire and/or spoil with passage of time;
associating at least one bar code with the article, the bar code containing information relating to the article that is stored in the electronic memory of the RFID tag and the electronic memory of the RFID tag containing the information that is encoded in the bar code;
providing a first station comprising a first RFID reader for transmitting and/or receiving information-bearing signals in the RFID tag format via a plurality of antennas defining detection regions proximate the first station, wherein antennas of the plurality of antennas are sequenced in time at a rate sufficient for receiving information-bearing signals transmitted by an RFID tag within the time that the RFID tag is within the detection region thereof irrespective of the orientation of the RFID tag;
communicating information contained in the received information-bearing signals from RFID tags in the detection regions of the first RFID reader to a processor, whereby information is communicated between the electronic memory of RFID tags and the processor via the RFID tag readers of the first station when the RFID tags are in the detection regions thereof;
storing in a database associated with the processor at least information contained in the received information-bearing signals, wherein the information stored in the database includes information relating to the articles; and
processing information from the data base for utilizing articles in an order relating to degradation, expiration and/or spoilage of the articles,
wherein the information relating to the article stored in the RFID tag is erasable and the RFID tag is re-encodable,
whereby information stored in the database may be accessed for dispensing articles on a first-in first-out or other basis to reduce spoilage and the RFID tags may be reprogrammed.

17. The method of claim 16:
wherein the electronic memory of the RFID tag contains information including any one or more of: inventory information, universal product code (UPC), manufacturer, make, brand name, model, type, a specific piece, a serial number, a batch identifier, a lot identifier, an identifying number, pricing, date of manufacture, date of receipt, expiration date, or any combination thereof; or wherein the electronic memory of the RFID tag includes information stored therein by a station relating to the identity of that station, to the operation performed at that station, or to both; or wherein the electronic memory of the RFID tag includes a relational check number representative of the information stored therein; or wherein the electronic memory of the RFID tag includes a unique permanent number associated with the RFID tag and a relational check number representative of the unique permanent number, of the information stored in the electronic memory, or of both the unique permanent number, and the information stored in the electronic memory; or wherein the RFID tag includes thereon in human-readable form, in machine-readable form, or in both forms, all or part of the information stored in the electronic memory thereof; or wherein the RFID tag is attached to the article and/or is attached to a container, package, crate, pallet, tote box, or other container containing the article;

wherein the RFID tag is resistant to tampering, enables detection of tampering, or both; or wherein the RFID tag is any one or more of tamper-resistant, tamper-destruct, tamper-evident, and high-temperature resistant; or wherein the RFID tag is removable for reuse; or
any combination of the foregoing.

18. The method of claim 16 further comprising erasing the information relating to the article RED tag stored in the electronic memory of the RFID tag.

19. The method of claim 16 wherein the first station is associated with a warehouse, a manufacturing facility, a processing facility, a display, a display rack, a shelf, a storage area, a storage bin, an entrance, an exit, an access way, a transport operation, a vehicle, an airplane, a ship, a train, a truck, a container, a storage container, a transport container, a crate, a package, a pallet, a wholesale operation, a check out, a dispensing location, a retail operation, a store, a display facility, or any combination of the foregoing.

20. The method of claim 16 further comprising providing a human perceivable indication responsive to the information stored in the database, wherein said providing a human perceivable indication includes providing a light, an audible alarm, an anti-theft alarm, a display on a computer monitor, a print out, or any combination thereof.

21. The method of claim 16 further comprising:
providing a second station comprising a second RFID reader for transmitting and/or receiving information-bearing signals in the RFID tag format via a second antenna defining a detection region proximate the second station; and said communicating further comprising communicating information contained in the received information-bearing signals from RFID tags in the detection regions of the second RFID reader to the processor, and said storing further comprising storing in a database associated with the processor at least information contained in the received information-bearing signals received by the first and second stations, wherein the information stored in the database of the station includes information relating to the articles in the detection regions of the first and second stations.

22. A method for tracking articles, managing articles, or both, wherein RFID tags are associated with the articles, comprising:
associating at least one RFID tag with an article, the RFID tag including an electronic memory containing information relating to the article and an antenna coupled to the electronic memory for transmitting and/or receiving information-bearing signals in an RFID tag format, wherein the information-bearing signals represent information to be stored in the electronic memory and/or represent information produced from the electronic memory;

associating at least one bar code with the article, the bar code containing information relating to the article that is stored in the electronic memory of the RFID tag and the electronic memory of the RFID tag containing the information that is encoded in the bar code;

providing a first station comprising a first RFID reader for transmitting and/or receiving information-bearing signals in the RFID tag format via a plurality of antennas defining detection regions proximate the first station, wherein ones of the plurality of antennas are located proximate a warehouse, a manufacturing facility, a processing facility, a display, a display rack, a shelf, a storage area, a storage bin, an entrance, an exit, an access way, a transport operation, a vehicle, an airplane, a ship, a train, a truck, a container, a storage container, a transport container, a crate, a package, a pallet, a wholesale operation, a check out, a dispensing location, a retail operation, a store, a display facility, or any combination of the foregoing. wherein antennas of the plurality of antennas are sequenced in time at a rate sufficient for receiving information-bearing signals transmitted by an RFID tag within the time that the RFID tag is within the detection region thereof irrespective of the orientation of the RFID tag;

communicating information contained in the received information-bearing signals from RFID tags in the detection regions of the first RFID reader to a processor, whereby information is communicated between the electronic memory of RFID tags and the processor via the RFID tag readers of the first station when the RFID tags are in the detection regions thereof;

storing in a database associated with the processor at least information contained in the received information-bearing signals, wherein the information stored in the database includes information relating to the articles; and processing information from the data base for utilizing articles in an order relating to degradation, expiration and/or spoilage of the articles, wherein the information relating to the article stored in the RFID tag is erasable and the RFID tag is re-encodable, whereby information stored in the database may be accessed for dispensing articles on a first-in first-out or other basis to reduce spoilage and the RFID tags may be reprogrammed.

23. The method of claim 22:
wherein the electronic memory of the RFID tag contains information including any one or more of: inventory information, universal product code (UPC), manufacturer, make, brand name, model, type, a specific piece, a serial number, a batch identifier, a lot identifier, an identifying number, pricing, date of manufacture, date of receipt, expiration date, or any combination thereof; or wherein the electronic memory of the RFID tag includes information stored therein by a station relating to the identity of that station, to the operation performed at that station, or to both; or wherein the electronic memory of the RFID tag includes a relational check number representative of the information stored therein; or wherein the electronic memory of the RFID tag includes a unique permanent number associated with the RFID tag and a relational check number representative of the unique permanent number, of the information stored in the electronic memory, or of both the unique permanent number, and the information stored in the electronic memory; or wherein the RFID tag includes thereon in human-readable form, in machine-readable form, or in both forms, all or part of the information stored in the electronic memory thereof; or wherein the RFID tag is attached to the article and/or is attached to a container, package, crate, pallet, tote box, or other container containing the article;

wherein the RFID tag is resistant to tampering, enables detection of tampering, or both; or wherein the RFID tag is any one or more of tamper-resistant, tamper-destruct, tamper-evident, and high-temperature resistant; or wherein the RFID tag is removable for reuse; or any combination of the foregoing.

24. The method of claim 22 wherein the articles are of a sort that degrade, expire and/or spoil with passage of time, wherein the electronic memory of the RFID tag contains at least information from which a date of degradation, expiration and/or spoilage can be determined, and wherein the data base contains the information from which a date of degradation, expiration and/or spoilage can be determined, whereby articles can be dispensed on a first-in first-out or other basis to minimize spoilage.

25. The method of claim 22 further comprising erasing the information relating to the article RFID tag stored in the electronic memory of the RFID tag.

26. The method of claim 22 further comprising providing a human perceivable indication responsive to the information stored in the database, wherein said providing a human perceivable indication includes providing a light, an audible alarm, an anti-theft alarm, a display on a computer monitor, a print out, or any combination thereof.

27. The method of claim 22 further comprising:

providing a second station comprising a second RFID reader for transmitting and/or receiving information-bearing signals in the RFID tag format via a second antenna defining a detection region proximate the second station; and said communicating further comprising communicating information contained in the received information-bearing signals from RFID tags in the detection regions of the second RFID reader to the processor, and said storing further comprising storing in a database associated with the processor at least information contained in the received information-bearing signals received by the first and second stations, wherein the information stored in the database of the station includes information relating to the articles in the detection regions of the first and second stations.

28. A system for tracking articles, managing articles, or both, wherein RFID tags are associated with the articles, comprising:

at least one RFID tag associated with an article, said RFID tag including an electronic memory containing information relating to the article and an antenna coupled to the electronic memory for transmitting and/or receiving information-bearing signals in an RFID tag format, wherein the information-bearing signals represent information to be stored in the electronic memory and/or represent information produced from the electronic memory;

wherein the information relating to the article stored in the RFID tag is erasable and the RFID tag is re-encodable;

at least one bar code associated with the article, the bar code containing information relating to the article that is stored in the electronic memory of the RFID tag and the electronic memory of the RFID tag containing the information that is encoded in the bar code;

a first station comprising a first RFID reader for transmitting and/or receiving information-bearing signals in the RFID tag format via a plurality of antennas defining detection regions proximate said first station, wherein ones of said plurality of antennas are located proximate a warehouse, a manufacturing facility, a processing facility, a display, a display rack, a shelf, a storage area, a storage bin, an entrance, an exit, an access way, a transport operation, a vehicle, an airplane, a ship, a train, a truck, a container, a storage container, a transport container, a crate, a package, a pallet, a wholesale operation, a check out, a dispensing location, a retail operation, a store, a display facility, or any combination of the foregoing. wherein antennas of the plurality of antennas are sequenced in time at a rate sufficient for receiving information-bearing signals transmitted by an RFID tag within the time that the RFID tag is within the detection region thereof irrespective of the orientation of the RFID tag;

a processor including a database;

means for communicating information contained in the received information-bearing signals from RFID tags in the detection regions of said first RFID reader to the database of said processor, whereby information is communicated between the electronic memory of RFID tags and the processor via the RFID tag readers of the first station when the RFID tags are in the detection regions thereof;

said processor storing in the database thereof at least information contained in the received information-bearing signals, wherein the information stored in the database of said processor includes information relating to the articles; and said processor processing information from the data base thereof for utilizing articles in an order relating to degradation, expiration and/or spoilage of the articles, whereby information stored in the database may be accessed for dispensing articles on a first-in first-out or other basis to reduce spoilage and the RFID tags may be reprogrammed.

29. The system of claim 28:

wherein the electronic memory of the RFID tag contains information including any one or more of: inventory information, universal product code (UPC), manufacturer, make, brand name, model, type, a specific piece, a serial number, a batch identifier, a lot identifier, an identifying number, pricing, date of manufacture, date of receipt, expiration date, or any combination thereof; or wherein the electronic memory of the RFID tag includes information stored therein by a station relating to the identity of that station, to the operation performed at that station, or to both; or wherein the electronic memory of the RFID tag includes a relational check number representative of the information stored therein; or wherein the electronic memory of the RFID tag includes a unique permanent number associated with the RFID tag and a relational check number representative of the unique permanent number, of the information stored in the electronic memory, or of both the unique permanent number, and the information stored in the electronic memory; or wherein the RFID tag includes thereon in human-readable form, in machine-readable form, or in both forms, all or part of the information stored in the electronic memory thereof; or wherein the RFID tag is attached to the article and/or is attached to a container, package, crate, pallet, tote box, or other container containing the article;

wherein the RFID tag is resistant to tampering, enables detection of tampering, or both; or wherein the RFID tag is any one or more of tamper-resistant, tamper-destruct, tamper-evident, and high-temperature resistant; or wherein the RFID tag is removable for reuse; or any combination of the foregoing.

30. The system of claim 28 wherein the articles are of a sort that degrade, expire and/or spoil with passage of time, wherein the electronic memory of the RFID tag contains at least information from which a date of degradation, expiration and/or spoilage can be determined, and wherein the data base contains the information from which a date of degradation, expiration and/or spoilage can be determined, whereby articles can be dispensed on a first-in first-out or other basis to minimize spoilage.

31. The system of claim 28 further comprising erasing the information relating to the article RFID tag stored in the electronic memory of the RFID tag.

32. The system of claim 28 further comprising a human perceivable indicator responsive to the information stored in the database, wherein said human perceivable indicator includes a light, an audible alarm, an anti-theft alarm, a display on a computer monitor, a print out, or any combination thereof.

33. The system of claim 28 further comprising:
providing a second station comprising a second RFID reader for transmitting and/or receiving information-bearing signals in the RFID tag format via a second antenna defining a detection region proximate the second station; and said communicating further comprising communicating information contained in the received information-bearing signals from RFID tags in the detection regions of the second RFID reader to the processor, and said storing further comprising storing in a database associated with the processor at least information contained in the received information-bearing signals received by the first and second stations, wherein the information stored in the database of the station includes information relating to the articles in the detection regions of the first and second stations.

* * * * *